US009293149B2

(12) United States Patent
Bayer et al.

(10) Patent No.: US 9,293,149 B2
(45) Date of Patent: Mar. 22, 2016

(54) TIME WARP ACTIVATION SIGNAL PROVIDER, AUDIO SIGNAL ENCODER, METHOD FOR PROVIDING A TIME WARP ACTIVATION SIGNAL, METHOD FOR ENCODING AN AUDIO SIGNAL AND COMPUTER PROGRAMS

(71) Applicant: Fraunhofer-Gesellschaft zur Foerderung der angewandten Forschung e.V., Munich (DE)

(72) Inventors: Stefan Bayer, Nuremberg (DE); Sascha Disch, Fuerth (DE); Ralf Geiger, Erlangen (DE); Guillaume Fuchs, Erlangen (DE); Max Neuendorf, Nuremberg (DE); Gerald Schuller, Erfurt (DE); Bernd Edler, Hannover (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/538,748

(22) Filed: Nov. 11, 2014

(65) Prior Publication Data

US 2015/0066492 A1 Mar. 5, 2015

Related U.S. Application Data

(60) Division of application No. 13/004,525, filed on Jan. 11, 2011, which is a continuation of application No. PCT/EP2009/004874, filed on Jul. 6, 2009.

(60) Provisional application No. 61/079,873, filed on Jul. 11, 2008.

(51) Int. Cl.
*G10L 15/00* (2013.01)
*G10L 21/00* (2013.01)

(Continued)

(52) U.S. Cl.
CPC ............... *G10L 21/04* (2013.01); *G10L 19/002* (2013.01); *G10L 19/022* (2013.01);
(Continued)

(58) Field of Classification Search
USPC ................................. 704/200–257, 500–504
See application file for complete search history.

(56) References Cited

U.S. PATENT DOCUMENTS 5,054,075 A 10/1991 Hong et al.
5,606,642 A 2/1997 Stautner et al.

(Continued)

FOREIGN PATENT DOCUMENTS

CN 1408146 A 4/2003
CN 101025918 A 8/2007

(Continued)

OTHER PUBLICATIONS

"eX-Celp", 3GPP2-Drafts, 2500 Wilson Boulevard, Suite 300, Arlington, Virginia 22201 USA, XP040353007 Seattle, WA, Apr. 1-13, 2000, & p. 7 line 1-last line; figures 1,2.

(Continued)

*Primary Examiner* — Jesse Pullias
(74) *Attorney, Agent, or Firm* — Michael A. Glenn; Perkins Coie LLP

(57) ABSTRACT

An audio encoder has a window function controller, a windower, a time warper with a final quality check functionality, a time/frequency converter, a TNS stage or a quantizer encoder, the window function controller, the time warper, the TNS stage or an additional noise filling analyzer are controlled by signal analysis results obtained by a time warp analyzer or a signal classifier. Furthermore, a decoder applies a noise filling operation using a manipulated noise filling estimate depending on a harmonic or speech characteristic of the audio signal.

4 Claims, 25 Drawing Sheets

(ENCODER)

(51) Int. Cl.

| | |
|---|---|
| ***G10L 21/02*** | (2013.01) |
| ***G10L 21/04*** | (2013.01) |
| ***G10L 19/002*** | (2013.01) |
| ***G10L 19/028*** | (2013.01) |
| ***G10L 19/022*** | (2013.01) |
| ***G10L 19/032*** | (2013.01) |
| ***G10L 21/043*** | (2013.01) |
| ***G10L 25/90*** | (2013.01) |
| ***G10L 19/26*** | (2013.01) |

(52) U.S. Cl.
CPC ............ *G10L 19/028* (2013.01); *G10L 19/032* (2013.01); *G10L 19/265* (2013.01); *G10L 21/043* (2013.01); *G10L 25/90* (2013.01)

(56) References Cited

U.S. PATENT DOCUMENTS

| | | | | |
|---|---|---|---|---|
| 5,659,622 | A | 8/1997 | Ashley | |
| 5,704,003 | A | 12/1997 | Kleijn et al. | |
| 5,835,889 | A | 11/1998 | Kapanen | |
| 5,848,391 | A | 12/1998 | Bosi et al. | |
| 6,058,362 | A | 5/2000 | Malvar | |
| 6,070,137 | A | 5/2000 | Bloebaum et al. | |
| 6,122,618 | A | 9/2000 | Park | |
| 6,134,518 | A | 10/2000 | Cohen et al. | |
| 6,223,151 | B1 * | 4/2001 | Kleijn et al. | 704/207 |
| 6,330,533 | B2 | 12/2001 | Su et al. | |
| 6,366,880 | B1 | 4/2002 | Ashley | |
| 6,424,938 | B1 | 7/2002 | Johansson et al. | |
| 6,449,590 | B1 | 9/2002 | Gao | |
| 6,453,285 | B1 | 9/2002 | Anderson et al. | |
| 6,691,084 | B2 | 2/2004 | Manjunath et al. | |
| 6,850,884 | B2 | 2/2005 | Gao et al. | |
| 6,925,435 | B1 | 8/2005 | Gao | |
| 6,963,842 | B2 | 11/2005 | Goodwin | |
| 6,978,241 | B1 | 12/2005 | Sluijter et al. | |
| 7,024,358 | B2 | 4/2006 | Shlomot et al. | |
| 7,043,423 | B2 | 5/2006 | Vinton et al. | |
| 7,047,185 | B1 | 5/2006 | Younes et al. | |
| 7,146,324 | B2 * | 12/2006 | Den Brinker et al. | 704/500 |
| 7,260,522 | B2 | 8/2007 | Gao et al. | |
| 7,286,980 | B2 | 10/2007 | Wang et al. | |
| 7,313,519 | B2 | 12/2007 | Crockett | |
| 7,366,658 | B2 | 4/2008 | Moogi et al. | |
| 7,412,379 | B2 | 8/2008 | Taori et al. | |
| 7,454,330 | B1 | 11/2008 | Nishiguchi et al. | |
| 7,457,757 | B1 | 11/2008 | McNeill et al. | |
| 7,720,677 | B2 | 5/2010 | Villemoes | |
| 8,239,190 | B2 | 8/2012 | Kapoor et al. | |
| 2002/0118845 | A1 | 8/2002 | Henn et al. | |
| 2002/0173969 | A1 | 11/2002 | Ojanpera | |
| 2003/0004718 | A1 | 1/2003 | Rao | |
| 2003/0009325 | A1 | 1/2003 | Kirchherr et al. | |
| 2003/0065509 | A1 | 4/2003 | Walker | |
| 2003/0200081 | A1 | 10/2003 | Wada et al. | |
| 2003/0233234 | A1 | 12/2003 | Truman et al. | |
| 2005/0043945 | A1 | 2/2005 | Droppo et al. | |
| 2005/0251387 | A1 | 11/2005 | Jelinek et al. | |
| 2005/0267746 | A1 | 12/2005 | Jelinek et al. | |
| 2006/0206334 | A1 | 9/2006 | Kapoor et al. | |
| 2006/0277039 | A1 | 12/2006 | Vos et al. | |
| 2006/0282263 | A1 | 12/2006 | Vos et al. | |
| 2007/0079227 | A1 | 4/2007 | Singh et al. | |
| 2007/0100607 | A1 * | 5/2007 | Villemoes | 704/207 |
| 2008/0004869 | A1 | 1/2008 | Herre et al. | |
| 2008/0312914 | A1 * | 12/2008 | Rajendran et al. | 704/207 |
| 2010/0046759 | A1 | 2/2010 | Pang et al. | |
| 2010/0198586 | A1 | 8/2010 | Edler et al. | |
| 2010/0241433 | A1 | 9/2010 | Herre et al. | |
| 2011/0029317 | A1 | 2/2011 | Chen et al. | |
| 2011/0106542 | A1 | 5/2011 | Bayer et al. | |
| 2011/0158415 | A1 | 6/2011 | Bayer et al. | |
| 2011/0161088 | A1 | 6/2011 | Bayer et al. | |
| 2011/0178795 | A1 | 7/2011 | Bayer et al. | |
| 2011/0268279 | A1 | 11/2011 | Ishikawa et al. | |

FOREIGN PATENT DOCUMENTS

| | | | |
|---|---|---|---|
| EP | 1035242 | | 9/2000 |
| EP | 1271417 | A2 | 1/2003 |
| EP | 1632934 | A1 | 3/2006 |
| EP | 1758101 | A1 | 2/2007 |
| EP | 1807825 | | 7/2007 |
| JP | 05297891 | A | 11/1993 |
| JP | 2003122400 | A | 4/2003 |
| JP | 2005-530205 | A | 10/2005 |
| JP | 2005-530206 | A | 10/2005 |
| JP | 2006079813 | A | 3/2006 |
| JP | 2006293230 | A | 10/2006 |
| JP | 2007051548 | A | 3/2007 |
| JP | 2007084597 | A | 4/2007 |
| JP | 2008529078 | A | 7/2008 |
| JP | 2009515207 | A | 4/2009 |
| JP | 2009541802 | A | 11/2009 |
| RU | 2262748 | C2 | 9/2000 |
| RU | 2158446 | C2 | 10/2000 |
| RU | 2194361 | C2 | 12/2002 |
| RU | 2004121463 | A | 12/2002 |
| RU | 2233010 | C2 | 7/2004 |
| RU | 2005113877 | | 10/2005 |
| RU | 2316059 | C2 | 1/2008 |
| TW | I294107 | | 4/1995 |
| TW | 200809771 | | 6/1996 |
| TW | 200822062 | | 8/1996 |
| TW | 444187 | | 7/2001 |
| WO | WO-00/11653 | | 3/2000 |
| WO | WO-03/107328 | A1 | 12/2003 |
| WO | WO-03/107329 | A1 | 12/2003 |
| WO | WO-2006/079813 | A1 | 8/2006 |
| WO | WO-2006/113921 | A1 | 10/2006 |
| WO | WO-2007/051548 | A1 | 5/2007 |
| WO | WO 2008000316 | A1 | 1/2008 |
| WO | WO-2009/121499 | A1 | 10/2009 |
| WO | WO-2010/003581 | A1 | 1/2010 |
| WO | WO-2010/003582 | A1 | 1/2010 |
| WO | WO-2010/003618 | A2 | 1/2010 |
| WO | WO-2010003583 | A1 | 1/2010 |

OTHER PUBLICATIONS

Bosi, "Generic Coding of Moving Pictures and Audio", Advanced Audio Coding, International Standard 13818-7, ISO/IECJTC1/SC29IWG11 Moving Pictures Expert Group, Apr. 1997, 108 pages.

Chen, S et al., "A Window Switching Algorithm for AVS Audio Coding", IEEE International Conference on Wireless Communications, Networking and Mobile Computing (WICOM 2007): Piscataway, NJ, USA XP031261889 ISBN: 978-1-4244-1311-9 p. 2890, left-hand column, line 1-p. 2891, right-hand column, last line; figure 2., Sep. 2007, 2889-2892.

Fielder, L et al., "AC-2 and AC-3: Low-Complexity Transform-Based", Collected Papers on Digital Audio Bit-Rate Reduction, XP009045603 p. 60, line 11, p. 61 line 16, paragraph r; figures 3, 4; p. 63, line 20-p. 64, line 8; p. 66, line 4-line 37; p. 67, line 30-line 40, Jan. 1996, pp. 54-72.

Gao, Y et al., "Ex-Celp: A Speech Coding Paradigm", IEEE International Conference on Acoustics, Speech, and Signal Processing (ICASSP). Salt Lake City, UT, USA. vol. 2. XP010803749., May 2001, pp. 689-692.

Herre, J et al., "Extending the MPEG-4 AAC Codec by Perceptual Noise Substitution", Preprints of Papers Presented at the AES Convention, XP008006769 "The Perceptual Noise Substitution Technique" Fig.3., Jan. 1998, pp. 1-14.

Herre, J et al., "Enhancing the Performance of Perceptual Audio Coders by Using", Preprints of Papers Presented at the AES Convention, XP0021 02636 p. 7, line 9-last line; table 1, Nov. 1996, pp. 1-24.

Krishnan, V et al., "EVRC-Wideband: The New 3GPP2 Wideband Vocoder Standard", IEEE International Conference on Acoustics, Speech, and Signal Processing, Honolulu, HI, USA, pp. 11-333,

(56) References Cited

OTHER PUBLICATIONS

XP03463184, ISBN:978-1-4244-0727-9 p. 334, line 8-p. 335, line 23' figure 1., Apr. 2007, pp. II 333-II 336.
Sluijter, R et al., "A time warper for speech signals", 1999 IEEE Workshop on Speech Coding Proceedings, XP010345551; p. 150, left-hand column, line 10-line 40, p. 151, left-hand column, line 25-p. 152, right-hand column, line 3; figures 1-3., Jun. 1999, pp. 150-152.
Yang, Huimin et al., "Pitch synchronous modulated lapped transform of the linear prediction of residual speech", Proceedings of the Conference on Signal Processing XP002115036 paragraphs 2, 3, figure 2., Oct. 1998, pp. 591-594.
Basu, et al., "Adaptive short-time analysis-synthesis for speech enhancement", IEEE International Conference on Acoustics, Speech, and Signal Processing, Mar. 31-Apr. 4, 2008, 4 pages.

* cited by examiner (ENCODER)

(DECODER)

| speech classif. | | time warp | | signal classif. | | noise fill. level |
|---|---|---|---|---|---|---|
| V | UV | YES | NO | speech | no speech | |
| | | | X | | X | normal |
| | | X | | | X | low |
| X | | X | | X | | very low/zero |
| | X | | X | X | | normal |

| pitch control | | signal classif. | | TNS decis. threshold |
| --- | --- | --- | --- | --- |
| YES | NO | speech (voiced) | no speech (unvoiced) | |
| | X | | X | normal |
| X | | | X | lower |
| X | | X | | (even) lower |

pitch
H
L
before warp
t
after warp
S.R. incr.
S.R. dect.
A(f)
BW
decr.
BW
increase
900
BW
decrease
f

| $T_{ein}$ | $f_{SR}$ | $\Delta f$ | N |
|---|---|---|---|
| $=T_N$ | $=f_N$ | $=\Delta f_N$ | $=N_N$ |
| $>T_N$ | $>f_N$ | $>\Delta f_N$ | $< N_N$ delete lines |
| $<T_N$ | $<f_N$ | $<\Delta f_N$ | $> N_N$ add lines |

$f_{SR}$ : local sampling rate $\Delta f$ : width of a spectral line/ distance between spectral lines N : number of lines as determined by the processor $T_{ein}$ : length of unwarped frame (depends on warp characteristic)

FIG 12B

TIME WARP ACTIVATION SIGNAL PROVIDER, AUDIO SIGNAL ENCODER, METHOD FOR PROVIDING A TIME WARP ACTIVATION SIGNAL, METHOD FOR ENCODING AN AUDIO SIGNAL AND COMPUTER PROGRAMS

CROSS-REFERENCE TO RELATED APPLICATIONS

This application is a divisional of copending U.S. patent application Ser. No. 13/004,525, filed Jan. 11, 2011, which is a continuation of International Application No. PCT/EP2009/004874, filed Jul. 6, 2009, which claims priority from U.S. Provisional Patent Application No. 61/079,873 filed Jul. 11, 2008, each of which is incorporated herein in its entirety by this reference thereto.

BACKGROUND OF THE INVENTION

The present invention is related to audio encoding and decoding and specifically for encoding/decoding of audio signal having a harmonic or speech content, which can be subjected to a time warp processing.

In the following, a brief introduction will be given into the field of time warped audio encoding, concepts of which can be applied in conjunction with some of the embodiments of the invention.

In the recent years, techniques have been developed to transform an audio signal into a frequency domain representation, and to efficiently encode this frequency domain representation, for example taking into account perceptual masking thresholds. This concept of audio signal encoding is particularly efficient if the block length, for which a set of encoded spectral coefficients are transmitted, are long, and if only a comparatively small number of spectral coefficients are well above the global masking threshold while a large number of spectral coefficients are nearby or below the global masking threshold and can thus be neglected (or coded with minimum code length).

For example, cosine-based or sine-based modulated lapped transforms are often used in applications for source coding due to their energy compaction properties. That is, for harmonic tones with constant fundamental frequencies (pitch), they concentrate the signal energy to a low number of spectral components (sub-bands), which leads to an efficient signal representation.

Generally, the (fundamental) pitch of a signal shall be understood to be the lowest dominant frequency distinguishable from the spectrum of the signal. In the common speech model, the pitch is the frequency of the excitation signal modulated by the human throat. If only one single fundamental frequency would be present, the spectrum would be extremely simple, comprising the fundamental frequency and the overtones only. Such a spectrum could be encoded highly efficiently. For signals with varying pitch, however, the energy corresponding to each harmonic component is spread over several transform coefficients, thus leading to a reduction of coding efficiency.

In order to overcome this reduction of coding efficiency, the audio signal to be encoded is effectively resampled on a non-uniform temporal grid. In the subsequent processing, the sample positions obtained by the non-uniform resampling are processed as if they would represent values on a uniform temporal grid. This operation is commonly denoted by the phrase 'time warping'. The sample times may be advantageously chosen in dependence on the temporal variation of the pitch, such that a pitch variation in the time warped version of the audio signal is smaller than a pitch variation in the original version of the audio signal (before time warping). This pitch variation may also be denoted with the phrase "time warp contour". After time warping of the audio signal, the time warped version of the audio signal is converted into the frequency domain. The pitch-dependent time warping has the effect that the frequency domain representation of the time warped audio signal typically exhibits an energy compaction into a much smaller number of spectral components than a frequency domain representation of the original (non time warped) audio signal.

At the decoder side, the frequency-domain representation of the time warped audio signal is converted back to the time domain, such that a time-domain representation of the time warped audio signal is available at the decoder side. However, in the time-domain representation of the decoder-sided reconstructed time warped audio signal, the original pitch variations of the encoder-sided input audio signal are not included. Accordingly, yet another time warping by resampling of the decoder-sided reconstructed time domain representation of the time warped audio signal is applied. In order to obtain a good reconstruction of the encoder-sided input audio signal at the decoder, it is desirable that the decoder-sided time warping is at least approximately the inverse operation with respect to the encoder-sided time warping. In order to obtain an appropriate time warping, it is desirable to have an information available at the decoder which allows for an adjustment of the decoder-sided time warping.

As it is typically needed to transfer such an information from the audio signal encoder to the audio signal decoder, it is desirable to keep a bit rate needed for this transmission small while still allowing for a reliable reconstruction of the needed time warp information at the decoder side.

In view of the above discussion, there is a desire to create a concept which allows for a bitrate efficient application of the time warp concept in an audio encoder.

SUMMARY

According to an embodiment, an audio encoder for encoding an audio signal may have a time warper; a time-frequency converter for performing a time/frequency conversion of a time-warped audio signal into a spectral representation; a quantizer for quantizing audio values, wherein the quantizer is configured to quantize to zero audio values below a quantization threshold; a noise filling calculator for estimating a measure of an energy of audio values quantized to zero for a time frame of the audio signal to acquire a noise filling measure; an audio signal analyzer for analyzing, whether the time frame of the audio signal has a harmonic or speech characteristic; a manipulator for manipulating the noise filling measure depending on a harmonic or a speech characteristic of the audio signal to acquire a manipulated noise filling measure; and an output interface for generating an encoded signal for transmission or storage, the encoded signal having the manipulated noise filling measure; wherein the manipulator is configured to apply a normal noise level when the signal does not have an harmonic or speech characteristic and when no time warp is applied, and to manipulate the noise filling level to be lower than in the normal case when a pitch contour was found, which indicates a harmonic content, and the time warp is active.

According to another embodiment, a decoder for decoding an encoded audio signal may have an input interface for processing the encoded audio signal to acquire a noise filling measure and encoded audio data; a decoder/re-quantizer for generating re-quantized data; a signal analyzer for retrieving information, whether a time frame of the audio data has harmonic or speech characteristic; and a noise filler for generating noise filling audio data, wherein the noise filler is configured to generate noise filling data in response to the noise filling measure and the harmonic or speech characteristic of the audio data; and a processor for processing the re-quantized data and the noise filling audio data to acquire a decoded audio signal; wherein the encoded audio signal has data indicating, whether the time frame of the audio data has a harmonic or speech characteristic, and wherein the signal analyzer is configured for analyzing the encoded audio signal to retrieve a data indicating, whether the time frame of the audio data has a harmonic or speech characteristic; wherein the data is an indication that the time portion has been subjected to a time warping processing, and wherein the processor has a time dewarper for time dewarping an audio signal derived from noise filling data and re-quantized data.

According to another embodiment, a method for encoding an audio signal may have the steps of time warping an audio signal; performing a time/frequency conversion of a time-warped audio signal into a spectral representation; quantizing audio values, wherein values below a quantization threshold are quantized to zero; estimating a measure of an energy of audio values quantized to zero for a time frame of the audio signal; analyzing, whether the time frame of the audio signal has a harmonic or speech characteristic; manipulating the noise filling measure depending on a harmonic or a speech characteristic of the audio signal to acquire a manipulated noise filling measure such that a normal noise level is applied when the signal does not have an harmonic or speech characteristic and when no time warp is applied, and such that the noise filling level is manipulated to be lower than in the normal case when a pitch contour was found, which indicates a harmonic content, and the time warp is active; and generating an encoded signal for transmission or storage, the encoded signal having the manipulated noise filling measure.

According to another embodiment, a method for decoding an encoded audio signal, wherein the encoded audio signal has data indicating, whether the time frame of the audio data has a harmonic or speech characteristic, may have the steps of processing the encoded audio signal to acquire a noise filling measure and encoded audio data; analyzing the encoded audio signal to retrieve a data indicating, whether the time frame of the audio data has a harmonic or speech characteristic, wherein the data is an indication that the time portion has been subjected to a time warping processing; generating re-quantized data; retrieving information, whether a time frame of the audio data has harmonic or speech characteristic; and generating noise filling audio data in response to the noise filling measure and the harmonic or speech characteristic of the audio data; and processing the re-quantized data and the noise filling audio data to acquire a decoded audio signal wherein the processing includes time dewarping an audio signal derived from noise filling data and re-quantized data.

According to another embodiment, a computer program may have a program code for performing, when running on a computer, one of the above mentioned methods.

According to another embodiment, an audio encoder for generating an encoded audio signal, may have an audio signal analyzer for analyzing, whether a time frame of the audio signal has a harmonic or speech characteristic; a window function controller for selecting a window function depending on a harmonic or speech characteristic of the audio signal; a windower for windowing the audio signal using the selected window function to acquire a windowed frame; and a processor for further processing the windowed frame to acquire the encoded audio signal; wherein the window function controller has a transient detector for detecting a transient, wherein the window function controller is configured for switching from a window function for a long block to a window function for a short block, when a transient is detected and a harmonic or speech characteristic is not found by the audio signal analyzer, and for not switching to the window function for the short block, when a transient is detected and a harmonic or speech characteristic is found by the audio signal analyzer; and wherein the window function controller is configured for switching to a window function being longer than the window function for a short block and adapted to acquire a shorter left-sided overlap length with a previous window than the window function for a long block, when a transient is detected and the signal has a harmonic or speech characteristic, such that the window function adapted to acquire a shorter overlap length is used for windowing a speech onset or an onset of a harmonic signal.

According to another embodiment, an audio encoder for generating an encoded audio signal may have an audio signal analyzer for analyzing, whether a time frame of the audio signal has a harmonic or speech characteristic; a window function controller for selecting a window function depending on a harmonic or speech characteristic of the audio signal; a windower for windowing the audio signal using the selected window function to acquire a windowed frame; and a processor for further processing the windowed frame to acquire the encoded audio signal, and a transient detector; wherein the transient detector is configured for detecting a quantitative characteristic of the audio signal and to compare the quantitative characteristic to a controllable threshold, wherein a transient is detected, when the quantitative characteristic has a predetermined relation to the controllable threshold, and wherein the audio signal analyzer is configured for controlling the variable threshold so that a likelihood for a switch to a window function for a short block is reduced, when the audio signal analyzer has found a harmonic or speech characteristic.

According to another embodiment, a method for generating an encoded audio signal may have the steps of analyzing, whether a time frame of the audio signal has a harmonic or speech characteristic; selecting a window function depending on a harmonic or speech characteristic of the audio signal; windowing the audio signal using the selected window function to acquire a windowed frame; and processing the windowed frame to acquire the encoded audio signal; wherein a switching is performed from a window function for a long block to a window function for a short block, when a transient is detected and a harmonic or speech characteristic is not found by the analyzing, and wherein a switching is performed to a window function being longer than the window function for a short block and having a shorter left-sided overlap than the window function for a long block, when a transient is detected and the signal has a harmonic or speech characteristic, such that the window function having a shorter overlap is used for windowing a speech onset or an onset of a harmonic signal.

According to another embodiment, a method for generating an encoded audio signal may have the steps of analyzing, whether a time frame of the audio signal has a harmonic or speech characteristic; selecting a window function depending on a harmonic or speech characteristic of the audio signal; windowing the audio signal using the selected window function to acquire a windowed frame; and processing the windowed frame to acquire the encoded audio signal; wherein a quantitative characteristic of the audio signal is detected and the quantitative characteristic is compared to a controllable threshold, wherein a transient is detected, when the quantitative characteristic has a predetermined relation to the controllable threshold; and wherein the variable threshold is controlled so that a likelihood for a switch to a window function for a short block is reduced, when a harmonic or speech characteristic has been found.

According to another embodiment, a computer program may have a program code for performing, when running on a computer, one of the above mentioned methods.

According to another embodiment, an audio encoder for generating an audio signal may have a controllable time warper for time warping the audio signal to acquire a time warped audio signal; a time/frequency converter for converting at least a portion of the time warped audio signal into a spectral representation; a temporal noise shaping stage for performing a prediction filtering over frequency of the spectral representation in accordance with a temporal noise shaping control instruction, wherein the prediction filtering is not performed, when the temporal noise shaping control instruction does not exist; a temporal noise shaping controller for generating the temporal noise shaping control instruction based on the spectral representation, wherein the temporal noise shaping controller is configured for increasing a likelihood for performing the predictive filtering over frequency, when the spectral representation is based on a time warped audio signal or for decreasing the likelihood for performing the prediction filtering over frequency, when the spectral representation is not based on a time warped audio signal; and a processor for further processing an output of the temporal noise shaping stage to acquire the encoded audio signal; wherein the temporal noise shaping controller is configured for estimating a gain in a bitrate or a quality, when the audio signal is subjected to the prediction filtering by the temporal noise shaping stage, for comparing the estimated gain to a decision threshold, and for deciding, in favor of the prediction filtering, when the estimated gain is in a predetermined relation to the decision threshold, wherein the temporal noise shaping controller is furthermore configured for varying the decision threshold so that, for the same estimated gain, the prediction filtering is activated, when the spectral representation is based on a time warped signal, and is not activated, when the spectral representation is not based on a time-warped audio signal.

According to another embodiment, a method for generating an audio signal may have the steps of for time warping the audio signal to acquire a time warped audio signal; converting at least a portion of the time warped audio signal into a spectral representation; performing a prediction filtering over frequency of the spectral representation in accordance with a temporal noise shaping control instruction, wherein the prediction filtering is not performed, when the temporal noise shaping control instruction does not exist; generating the temporal noise shaping control instruction based on the spectral representation, wherein a likelihood for performing the predictive filtering over frequency is increased, when the spectral representation is based on a time warped audio signal or wherein the likelihood for performing the prediction filtering over frequency is decreased, when the spectral representation is not based on a non-time-warped audio signal; and processing an output of the temporal noise shaping stage to acquire the encoded audio signal; wherein a gain in a bitrate or a quality, when the audio signal is subjected to the prediction filtering by the temporal noise shaping stage, is estimated, and wherein the estimated gain is compared to a decision threshold, for deciding, in favor of the prediction filtering, when the estimated gain is in a predetermined relation to the decision threshold, wherein the decision threshold is varied so that, for the same estimated gain, the prediction filtering is activated, when the spectral representation is based on a time warped signal, and is not activated, when the spectral representation is not based on a time-warped audio signal.

According to another embodiment, a computer program may have a program code for performing, when running on a computer, the above mentioned method.

According to another embodiment, an audio encoder for encoding an audio signal may have a time warper for warping an audio signal using a variable time warping characteristic; a time/frequency converter for converting a time warped audio signal into a spectral representation having a number of spectral coefficients; and a processor for processing a variable number of spectral coefficients to generate an encoded audio signal, wherein the processor is configured for variably setting a number of spectral coefficients for a frame of the audio signal based on the time warping characteristic for the frame so that a bandwidth variation represented by the processed number of frequency coefficients from frame to frame is reduced or eliminated.

According to another embodiment, a method for encoding an audio signal may have the steps of time warping an audio signal using a variable time warping characteristic; converting a time warped audio signal into a spectral representation having a number of spectral coefficients; and processing a variable number of spectral coefficients to generate an encoded audio signal, wherein a variable number of spectral coefficients for a frame of the audio signal is set based on the time warping characteristic for the frame so that a bandwidth variation represented by the processed number of frequency coefficients from frame to frame is reduced or eliminated.

According to another embodiment, a computer program may have a program code for performing, when running on a computer, the above mentioned method.

According to another embodiment, a time warp activation signal provider for providing a time warp activation signal on the basis of a representation of an audio signal, the time warp activation signal provider may have an energy compaction information provider configured to provide an energy compaction information describing a compaction of energy in a time warp transformed spectrum representation of the audio signal; and a comparator configured to compare the energy compaction information with a reference value, and to provide the time warp activation signal in dependence on a result of the comparison.

According to another embodiment, an audio signal encoder for encoding an input audio signal to acquire an encoded representation of the input audio signal, may have a time warp transformer configured to provide a time warp transformed spectral representation on the basis of the input audio signal using a time warp contour; a time warp activation signal provider as described above, wherein the time warp activation signal provider is configured to receive the input audio signal and to provide the time warp activation signal; and a controller configured to selectively provide, in dependence on the time warp activation signal, a newly found time warp contour information, describing a non-constant time warp contour portion, or a standard time warp contour information, describing a constant time warp contour portion, to the time warp transformer to describe the time warp contour used by the time warp transformer.

According to another embodiment, a method for providing a time warp activation signal on the basis of an audio signal may have the steps of providing an energy compaction information describing a compaction of energy in a time warp transformed spectral representation of the audio signal; comparing the energy compaction information with a reference value; and providing the time warp activation signal in dependence on the result of the comparison.

According to another embodiment, a method for encoding an input audio signal to acquire an encoded representation of the input audio signal, may have the steps of providing a time warp activation signal, wherein the energy compaction information describes a compaction of energy in a time warp transformed spectrum representation of the input audio signal; and selectively providing, in dependence on the time warp activation signal, a description of the time warp transformed spectral representation of the input audio signal or description of a non-time-warp-transformed spectral representation of the input audio signal for inclusion into the encoded representation of the input audio signal.

According to another embodiment, a computer program may have a program code for performing, when running on a computer, the above mentioned methods.

Embodiments according to the invention are related to methods for a time warped MDCT transform coder. Some embodiments are related to encoder-only tools. However, other embodiments are also related to decoder tools.

An embodiment of the invention creates a time warp activation signal provider for providing a time warp activation signal on the basis of a representation of an audio signal. The time warp activation signal provider comprises an energy compaction information provider configured to provide an energy compaction information describing a compaction of energy in a time warp transformed spectrum representation of the audio signal. The time warp activation signal provider also comprises a comparator configured to compare the energy compaction information with a reference value, and to provide the time warp activation signal in dependence on a result of the comparison.

This embodiment is based on the finding that the usage of a time warp functionality in an audio signal encoder typically brings along an improvement, in the sense of a reduction of the bitrate of the encoded audio signal, if the time warp transformed spectrum representation of the audio signal comprises a sufficiently compact energy distribution in that the energy is concentrated in one or more spectral regions (or spectral lines). This is due to the fact that a successful time warping brings along the effect of decreasing the bitrate by transforming a smeared spectrum, for example of an audio frame, into the spectrum having one or more discernable peaks, and consequently having a higher energy compaction than the spectrum of the original (non-time-warped) audio signal.

Regarding this issue, it should be understood that an audio signal frame, during which the pitch of the audio signal varies significantly, comprises a smeared spectrum. The time varying pitch of the audio signal has the effect that a time-domain to a frequency-domain transformation performed over the audio signal frame results in a smeared distribution of the signal energy over the frequency, particularly in the higher frequency region. Accordingly, a spectrum representation of such an original (non-time warped) audio signal comprises a low energy compaction and typically does not exhibit spectral peaks in a higher frequency portion of the spectrum, or only exhibits relatively small spectral peaks in the higher frequency portion of the spectrum. In contrast, if time warping is successful (in terms of providing an improvement of the encoding efficiency) the time warping of the original audio signal yields a time warped audio signal having a spectrum with relatively higher and clear peaks (particularly in the higher frequency portion of the spectrum). This is due to the fact that an audio signal having a time varying pitch is transformed into a time warped audio signal having a smaller pitch variation or even an approximately constant pitch. Consequently, the spectrum representation of the time warped audio signal (which can be considered as a time warp transformed spectrum representation of the audio signal) comprises one or more clear spectral peaks. In other words, the smearing of the spectrum of the original audio signal (having temporally variable pitch) is reduced by a successful time warp operation, such that the time warp transformed spectrum representation of the audio signal comprises higher energy compaction than the spectrum of the original audio signal. Nevertheless, time warping is not always successful in improving the coding efficiency. For example, time warping does not improve the coding efficiency if the input audio signal comprises large noise components, or if the extracted time warp contour is inaccurate.

In view of this situation, the energy compaction information provided by the energy compaction information provider is a valuable indicator for deciding whether the time warp is successful in terms of reducing the bitrate.

An embodiment of the invention creates a time warp activation signal provider for providing a time warp activation signal on the basis of a representation of an audio signal. The time warp activation provider comprises two time warp representation providers configured to provide two time warp representations of the same audio signal using different time warp contour information. Thus, the time warp representation providers may be configured (structurally and/or functionally) in the same way and use the same audio signal but different time warp contour information. The time warp activation signal provider also comprises two energy compaction information providers configured to provide a first energy compaction information on the basis of the first time warp representation and to provide a second energy compaction information on the basis of the second time warp representation. The energy compaction information providers may be configured in the same way but to use the different time warp representations. Furthermore the time warp activation signal provider comprises a comparator to compare the two different energy compaction information and to provide the time warp activation signal in dependence on a result of the comparison.

In an embodiment, the energy compaction information provider is configured to provide a measure of spectral flatness describing the time warp transformed spectrum representation of the audio signal as the energy compaction information. It has been found that time warp is successful, in terms of reducing a bitrate, if it transforms a spectrum of an input audio signal into a less flat time warp spectrum representing a time warped version of the input audio signal. Accordingly, the measure of spectral flatness can be used to decide, without performing a full spectral encoding process, whether the time warp should be activated or deactivated.

In an embodiment, the energy compaction information provider is configured to compute a quotient of a geometric mean of the time warp transformed power spectrum and an arithmetic mean of the time warp transformed power spectrum, to obtain the measure of the spectral flatness. It has been found that this quotient is a measure of spectral flatness which is well adapted to describe the possible bitrate savings obtainable by a time warping.

In another embodiment, the energy compaction information provider is configured to emphasize a higher-frequency portion of the time warp transformed spectrum representation when compared to a lower-frequency portion of the time warp transformed spectrum representation, to obtain the energy compaction information. This concept is based on the finding that the time warp typically has a much larger impact on the higher frequency range than on the lower frequency range.

Accordingly, a dominant assessment of the higher frequency range is appropriate in order to determine the effectiveness of the time warp using a spectral flatness measure. In addition, typical audio signals exhibit a harmonic content (comprising harmonics of a fundamental frequency) which decays in intensity with increasing frequency. An emphasis of a higher frequency portion of the time warp transformed spectrum representation when compared to a lower frequency portion of the time warp transformed spectrum representation also helps to compensate for this typical decay of the spectral lines with increasing frequency. To summarize, an emphasized consideration of the higher frequency portion of the spectrum brings along an increased reliability of the energy compaction information and therefore allows for a more reliable provision of the time warped activation signal.

In another embodiment, the energy compaction information provider is configured to provide a plurality of band-wise measures of spectral flatness, and to compute an average of the plurality of band-wise measures of spectral flatness, to obtain the energy compaction information. It has been found that the consideration of band-wise spectral flatness measures brings along a particularly reliable information as to whether the time warp is effective to reduce the bitrate of an encoded audio signal. Firstly, the encoding of the time warp transformed spectrum representation is typically performed in a band-wise manner, such that a combination of the band-wise measures of spectral flatness is well adapted to the encoding and therefore represents an obtainable improvement of the bitrate with good accuracy. Further, a band-wise computation of measures of spectral flatness substantially eliminates the dependency of the energy compaction information from a distribution of the harmonics. For example, even if a higher frequency band comprises a relatively small energy (smaller than the energies of lower frequency bands), the higher frequency band may still be perceptually relevant. However, the positive impact of a time warp (in the sense of a reduction of the smearing of the spectral lines) on this higher frequency band would be considered as small, simply because of the small energy of the higher frequency band, if the spectral flatness measure would not be computed in a band-wise manner. In contrast, by applying the band-wise calculation, a positive impact of the time warp can be taken into consideration with an appropriate weight, because the band-wise spectral flatness measures are independent from the absolute energies in the respective frequency bands.

In another embodiment, the time warp activation signal provider comprises a reference value calculator configured to compute a measure of spectral flatness describing an non-time-warped spectrum representation of the audio signal, to obtain the reference value. Accordingly, the time warp activation signal can be provided on the basis of a comparison of the spectral flatness of a non-time-warped (or "unwarped") version of the input audio signal and a spectral flatness of a time warped version of the input audio signal.

In another embodiment, the energy compaction information provider is configured to provide a measure of perceptual entropy describing the time warp transformed spectrum representation of the audio signal as the energy compaction information. This concept is based on the finding that the perceptual entropy of the time warp transformed spectrum representation is a good estimate of a number of bits (or a bitrate) needed to encode the time warp transformed spectrum. Accordingly, the measure of perceptual entropy of the time warp transformed spectrum representation is a good measure of whether a reduction of the bitrate can be expected by the time warping, even in view of the fact that an additional time warp information has to be encoded if the time warp is used.

In another embodiment, the energy compaction information provider is configured to provide an autocorrelation measure describing an autocorrelation of a time warped representation of the audio signal as the energy compaction information. This concept is based on the finding that the efficiency of the time warp (in terms of reducing the bitrate) can be measured (or at least estimated) on the basis of a time warped (or a non-uniformly resampled) time domain signal. It has been found that time warping is efficient if the time warped time domain signal comprises a relatively high degree of periodicity, which is reflected by the autocorrelation measure. In contrast, if the time warped time domain signal does not comprise a significant periodicity, it can be concluded that the time warping is not efficient.

This finding is based on the fact that an efficient time warp transforms a portion of a sinusoidal signal of a varying frequency (which does not comprise a periodicity) into a portion of a sinusoidal signal of approximately constant frequency (which comprises a high degree of periodicity). In contrast, if the time warping is not capable of providing a time domain signal having a high degree of periodicity, it can be expected that the time warping also does not provide a significant bitrate saving, which would justify its application.

In an embodiment, the energy compaction information provider is configured to determine a sum of absolute values of a normalized autocorrelation function (over a plurality of lag values) of the time warped representation of the audio signal, to obtain the energy compaction information. It has been found that a computationally complex determination of the autocorrelation peaks is not needed to estimate the efficiency of the time warping. Rather, it has been found that a summing evaluation of the autocorrelation over a (wide) range of autocorrelation lag values also brings along very reliable results. This is due to the fact that the time warp actually transforms a plurality of signal components (e.g. a fundamental frequency and harmonics thereof) of varying frequency into periodic signal components. Accordingly, the autocorrelation of such a time warped signal exhibits peaks at a plurality of autocorrelation lag values. Thus, a sum-formation is a computationally efficient way of extracting the energy compaction information from the autocorrelation.

In another embodiment, the time warp activation signal provider comprises a reference value calculator configured to compute the reference value on the basis of an non-time-warped spectral representation of the audio signal or on the basis of an non-time-warped time domain representation of the audio signal. In this case, the comparator is typically configured to form a ratio value using the energy compaction information describing a compaction of energy in a time warp transformed spectrum of the audio signal and the reference value. The comparator is also configured to compare the ratio value with one or more threshold values to obtain the time warp activation signal. It has been found that the ratio between an energy compaction information in the non-time-warped case and the energy compaction information in the time warped case allows for a computationally efficient but still sufficiently reliable generation of the time warp activation signal.

Another embodiment of the invention creates an audio signal encoder for encoding an input audio signal, to obtain an encoded representation of the input audio signal. The audio signal encoder comprises a time warp transformer configured to provide a time warp transformed spectrum representation on the basis of the input audio signal. The audio signal encoder also comprises a time warp activation signal provider, as described above. The time warp activation signal provider is configured to receive the input audio signal and to provide the energy compaction information such that the energy compaction information describes a compaction of energy in the time warp transformed spectrum representation of the input audio signal. The audio signal encoder further comprises a controller configured to selectively provide, in dependence on the time warp activation signal, a found non-constant (varying) time warp contour portion or time warping information, or a standard constant (non-varying) time warp contour portion or time warping information to the time warp transformer. In this way, it is possible to selectively accept or reject a found non-constant time warp contour portion in the derivation of the encoded audio signal representation from the input audio signal.

This concept is based on the finding that it is not always efficient to introduce a time warp information into an encoded representation of the input audio signal, because a remarkable number of bits is needed for encoding the time warp information. Further, it has been found that the energy compaction information, which is computed by the time warp activation signal provider, is a computationally efficient measure to decide whether it is advantageous to provide the time warp transformer with the found varying (non-constant) time warp contour portion or a standard (non-varying, constant) time warp contour. It has to be noted that when the time warp transformer comprises an overlapping transform, a found time warp contour portion may be used in the computation of two or more subsequent transform blocks. In particular, it has been found that it is not necessary to fully encode both the version of the time warp transformed spectral representation of the input audio signal using the newly found varying time warp contour portion and the version of the time warp transformed spectral representation of the input audio signal using a standard (non-varying) time warp contour portion in order to be able to make a decision whether the time warping allows for a saving in bitrate or not. Rather, it has been found that an evaluation of the energy compaction of the time warp transformed spectral representation of the input audio signal forms a reliable basis of the decision. Accordingly, a needed bitrate can be kept small.

In a further embodiment, the audio signal encoder comprises an output interface configured to selectively include, in dependence on the time warp activation signal, a time warp contour information representing a found varying time warp contour into the encoded representation of the audio signal Thus, a high efficiency of the audio signal encoding can be obtained, irrespective of whether the input signal is well suited for time warping or not.

A further embodiment according to the invention creates a method for providing a time warp activation signal on the basis of an audio signal. The method fulfills the functionality of the time warp activation signal provider and can be supplemented by any of the features and functionalities described here with respect to the time warp activation signal provider.

Another embodiment according to the invention creates a method for encoding an input audio signal, to obtain an encoded representation of the input audio signal. This method can be supplemented by any of the features and functionalities described herein with respect to the audio signal encoder.

Another embodiment according to the invention creates a computer program for performing the methods mentioned herein.

In accordance with a first aspect of the present invention, an audio signal analysis, whether an audio signal has a harmonic characteristic or a speech characteristic is advantageously used for controlling a noise filling processing on the encoder side and/or on the decoder side. The audio signal analysis is easily obtainable in a system, in which a time warp functionality is used, since this time warp functionality typically comprises a pitch tracker and/or a signal classifier for distinguishing between speech on the one hand and music on the other hand and/or for distinguishing between voiced speech and unvoiced speech. Since this information is available in such a context without any further costs, the information available is advantageously used for controlling the noise filling feature so that, especially for speech signals, a noise filling in between harmonic lines is reduced or, for speech signals in particular, even eliminated. Even in situations, where a strong harmonic content is obtained, but a speech is not directly detected by a speech detector, a reduction of noise filling nevertheless will result in a higher perceived quality. Although this feature is particularly useful in a system, in which the harmonic/speech analysis is performed anyway, and this information is, therefore, available without any additional costs, the control of the noise filling scheme based on a signal analysis, whether the signal has a harmonic or speech characteristic or not is additionally useful, even when a specific signal analyzer has to be inserted into the system, since the quality is enhanced without bitrate increase or, stated alternatively, the bitrate is decreased without having a loss in quality, since the bits needed for encoding the noise filling level are reduced when the noise filling level itself, which can be transmitted from an encoder to a decoder, is reduced.

In a further aspect of the present invention, the signal analysis result, i.e., whether the signal is a harmonic signal or a speech signal is used for controlling the window function processing of an audio encoder. It has been found that in a situation, in which a speech signal or a harmonic signal starts, the possibility is high that a straightforward encoder will switch from long windows to short windows. These short windows, however, have a correspondingly reduced frequency resolution which, on the other hand, would decrease the coding gain for strongly harmonic signals and therefore increase the number of bits needed to code such signal portion. In view of that, the present invention defined in this aspect uses windows longer than a short window when a speech or harmonic signal onset is detected. Alternatively, windows are selected with a length roughly similar to the long windows, but with a shorter overlap in order to effectively reduce pre-echoes. Generally, the signal characteristic, whether the time frame of an audio signal has a harmonic or a speech characteristic is used for selecting a window function for this time frame.

In accordance with a further aspect of the present invention, the TNS (temporal noise shaping) tool is controlled based on whether the underlying signal is based on a time warping operation or is in a linear domain. Typically, a signal which has been processed by a time warping operation will have a strong harmonic content. Otherwise, a pitch tracker associated with a time warping stage would not have output a valid pitch contour and, in the absence of such a valid pitch contour, a time warping functionality would have been deactivated for this time frame of the audio signal. However, harmonic signals will, normally, not be suitable for being subjected to the TNS processing. The TNS processing is particularly useful and induces a significant gain in bitrate/quality, when the signal processed by the TNS stage has a quite flat spectrum. When, however, the appearance of the signal is tonal, i.e., non-flat, as is the case for spectra having a harmonic content or voiced content, the gain in quality/bitrate provided by the TNS tool will be reduced. Therefore, without the inventive modification of the TNS tool, time-warped portions typically would not be TNS processed, but would be processed without a TNS filtering. On the other hand, the noise shaping feature of TNS nevertheless provides an improved quality specifically in situations, where the signal is varying in amplitude/power. In cases, where an onset of an harmonic signal or speech signal is present, and where the block switching feature is implemented so that, instead of this onset, long windows or at least windows longer than short windows are maintained, the activation of the temporal noise shaping feature for this frame will result in a concentration of the noise around the speech onset which effectively reduces pre-echoes, which might occur before the onset of the speech due to a quantization of the frame occurring in a subsequent encoder processing.

In accordance with a further aspect of the present invention, a variable number of lines is processed by a quantizer/entropy encoder within an audio encoding apparatus, in order to account for the variable bandwidth, which is introduced from frame to frame due to performing a time warping operation with a variable time warping characteristic/warping contour. When the time warping operation results in the situation that the time of the frame (in linear terms) included in a time warped frame is increased, the bandwidth of a single frequency line is decreased, and, for a constant overall bandwidth, the number of frequency lines to processed is to be increased regarding a non-time warp situation. When, on the other hand, the time warping operation results in the fact that the actual time of the audio signal in the time warped domain is decreased with respect to the block length of the audio signal in the linear domain, the frequency bandwidth of a single frequency line is increased and, therefore, the number of lines processed by a source encoder has to be decreased with respect to a non-time-warping situation in order to have a reduced bandwidth variation or, optimally, no bandwidth variation.

BRIEF DESCRIPTION OF THE DRAWINGS

Embodiments are subsequently described with respect to the accompanying drawings, in which:

FIG. 12*b* is a table showing the dependence between the local sampling rate in the time warped domain and the control of spectral coefficients.

DETAILED DESCRIPTION OF THE INVENTION

Figure 1:
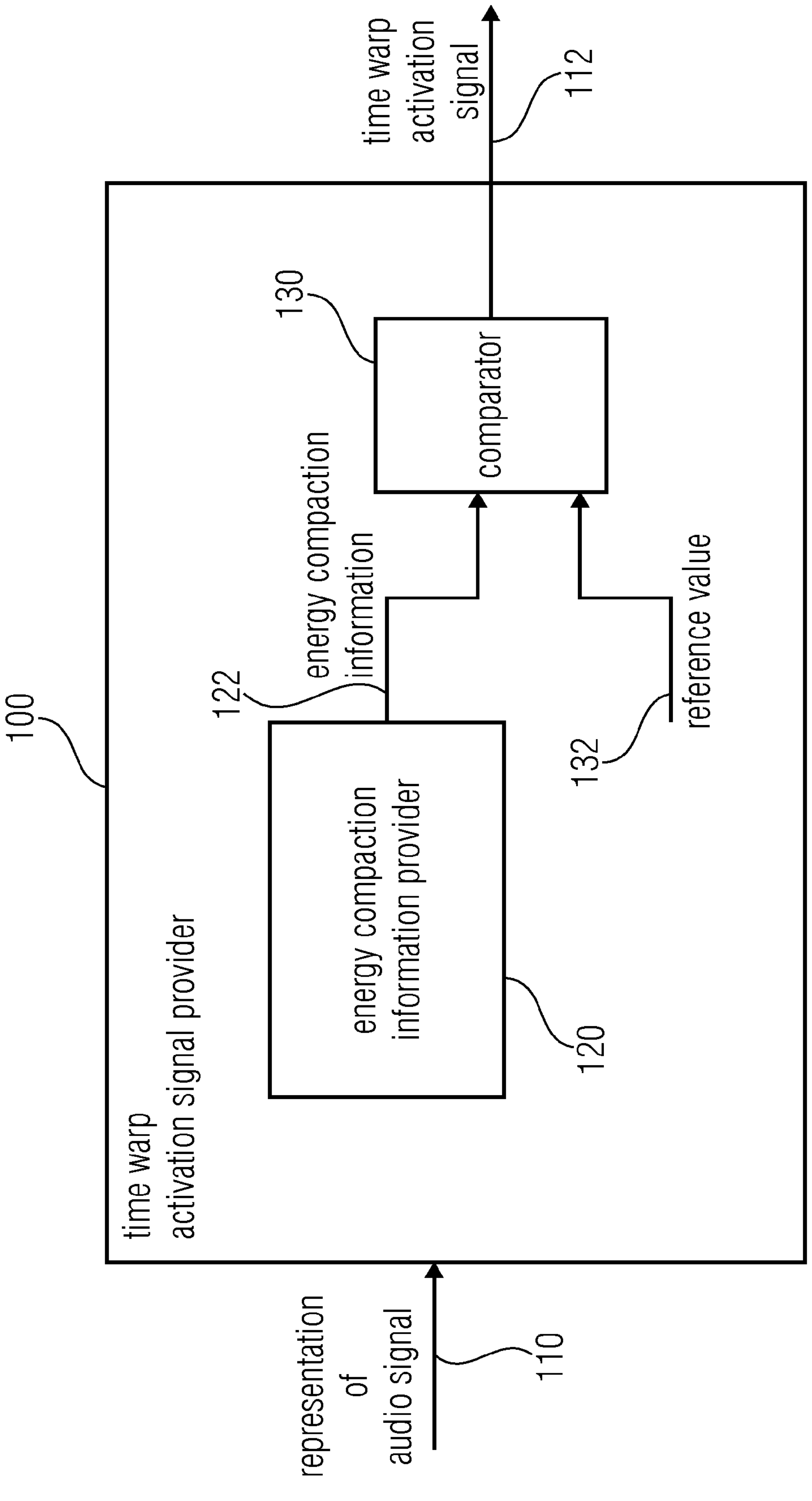
FIG. 1 is a block schematic diagram of a time warp activation signal provider, according to an embodiment of the invention.

FIG. 1 shows a block schematic diagram of the time warp activation signal provider, according to an embodiment of the invention. The time warp activation signal provider 100 is configured to receive a representation 110 of an audio signal and to provide, on the basis thereof, a time warp activation signal 112. The time warp activation signal provider 100 comprises an energy compaction information provider 120, which is configured to provide an energy compaction information 122, describing a compaction of energy in a time warp transformed spectrum representation of the audio signal. The time warp activation signal provider 100 further comprises a comparator 130 configured to compare the energy compaction information 122 with a reference value 132, and to provide the time warp activation signal 112 in dependence on the result of the comparison.

As discussed above, it has been found that the energy compaction information is a valuable information which allows for a computationally efficient estimation whether a time warp brings along a bit saving or not. It has been found that the presence of a bit saving is closely correlated with the question whether the time warp results in a compaction of energy or not.

Figure 2A:
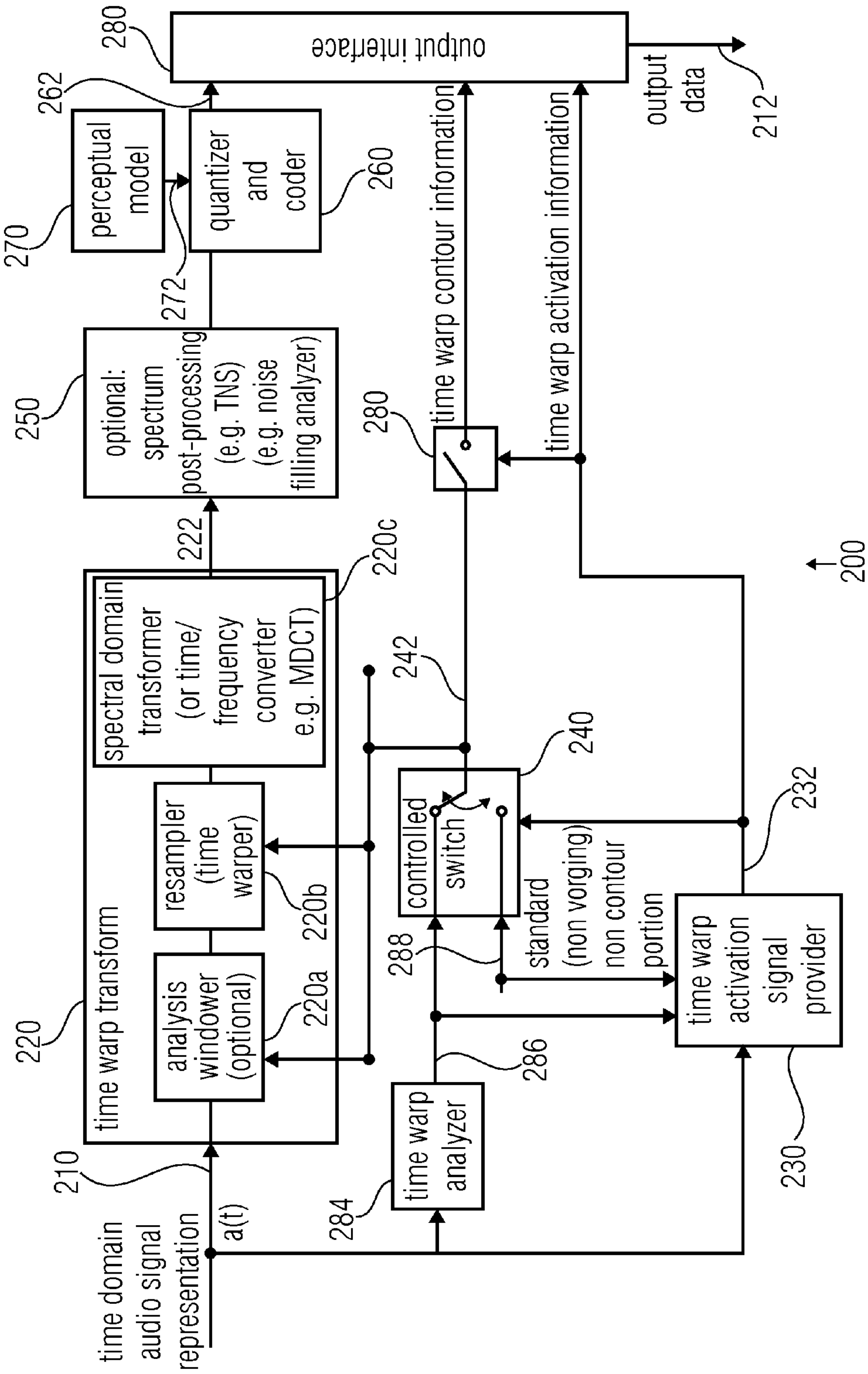
FIG. 2*a* is a block schematic diagram of an audio signal encoder, according to an embodiment of the invention.

FIG. 2*a* shows a block schematic diagram of an audio signal encoder 200, according to an embodiment of the invention. The audio signal encoder 200 is configured to receive an input audio signal 210 (also designated to a(t)) and to provide, on the basis thereof, an encoded representation 212 of the input audio signal 210. The audio signal encoder 200 comprises a time warp transformer 220, which is configured to receive the input audio signal 210 (which may be represented in a time domain) and to provide, on the basis thereof, a time warp transformed spectral representation 222 of the input audio signal 210. The audio signal encoder 200 further comprises a time warp analyzer 284, which is configured to analyze the input audio signal 210 and to provide, on the basis thereof, a time warp contour information (e.g. absolute or relative time warp contour information) 286.

The audio signal encoder 200 further comprises a switching mechanism, for example in the form of a controlled switch 240, to decide whether the found time warp contour information 286 or a standard time warp contour information 288 is used for further processing. Thus, the switching mechanism 240 is configured to selectively provide, in dependence on a time warp activation information, either the found time warp contour information 286 or a standard time warp contour information 288 as new time warp contour information 242, for a further processing, for example to the time warp transformer 220. It should be noted, that the time warp transformer 220 may for example use the new time warp contour information 242 (for example a new time warp contour portion) and, in addition, a previously obtained time warp information (for example one or more previously obtained time warp contour portions) for the time warping of an audio frame. The optional spectrum post processing may for example comprise a temporal noise shaping and/or a noise filling analysis. The audio signal encoder 200 also comprises a quantizer/encoder 260, which is configured to receive the spectral representation 222 (optionally processed by the spectrum post processing 250) and to quantize and encode the transformed spectral representation 222. For this purpose, the quantizer/encoder 260 may be coupled with a perceptual model 270 and receive a perceptual relevance information 272 from the perceptual model 270, to consider a perceptual masking and to adjust quantization accuracies in different frequency bins in accordance with the human perception. The audio signal encoder 200 further comprises an output interface 280 which is configured to provide the encoded representation 212 of the audio signal on the basis of the quantized and encoded spectral representation 262 provided by the quantizer/encoder 260.

The audio signal encoder 200 further comprises a time warp activation signal provider 230, which is configured to provide a time warp activation signal 232. The time warp activation signal 232 may, for example, be used to control the switching mechanism 240, to decide whether the newly found time warp contour information 286 or a standard time warp contour information 288 is used in further processing steps (for example by the time warp transformer 220). Further, the time warp activation information 232 may be used in a switch 280 to decide whether the selected new time warp contour information 242 (selected from newly found time warp contour information 286 and the standard time warp contour information) is included into the encoded representation 212 of the input audio signal 210. Typically, time warp contour information is only included into the encoded representation 212 of the audio signal if the selected time warp contour information describes a non-constant (varying) time warp contour. Also, time warp activation information 232 may itself be included into the encoded representation 212, for example in form of a one-bit flag indicating an activation or a deactivation of the time warp.

In order to facilitate the understanding, it should be noted that the time warp transformer 220 typically comprises an analysis windower 220*a*, a resampler or "time warper" 220*b* and a spectral domain transformer (or time/frequency converter) 220*c*. Depending on the implementation, however, the time warper 220*b* can be placed—in a signal processing direction—before the analysis windower 220*a*. However, time warping and time domain to spectral domain transformation may be combined in a single unit in some embodiments.

In the following, details regarding the operation of the time warp activation signal provider 230 will be described. It should be noted that the time warp activation signal provider 230 may be equivalent to the time warp activation signal provider 100.

The time warp activation signal provider 230 is configured to receive the time time domain audio signal representation 210 (also designated with a(t)), the newly found time warp contour information 286, and the standard time warp contour information 288. The time warp activation signal provider 230 is also configured to obtain, using the time domain audio signal 210, the newly found time warp contour information 286 and the standard time warp contour information 288, an energy compaction information describing a compaction of energy due to the newly found time warp contour information 286, and to provide the time warp activation signal 232 on the basis of this energy compaction information.

Figure 2B:
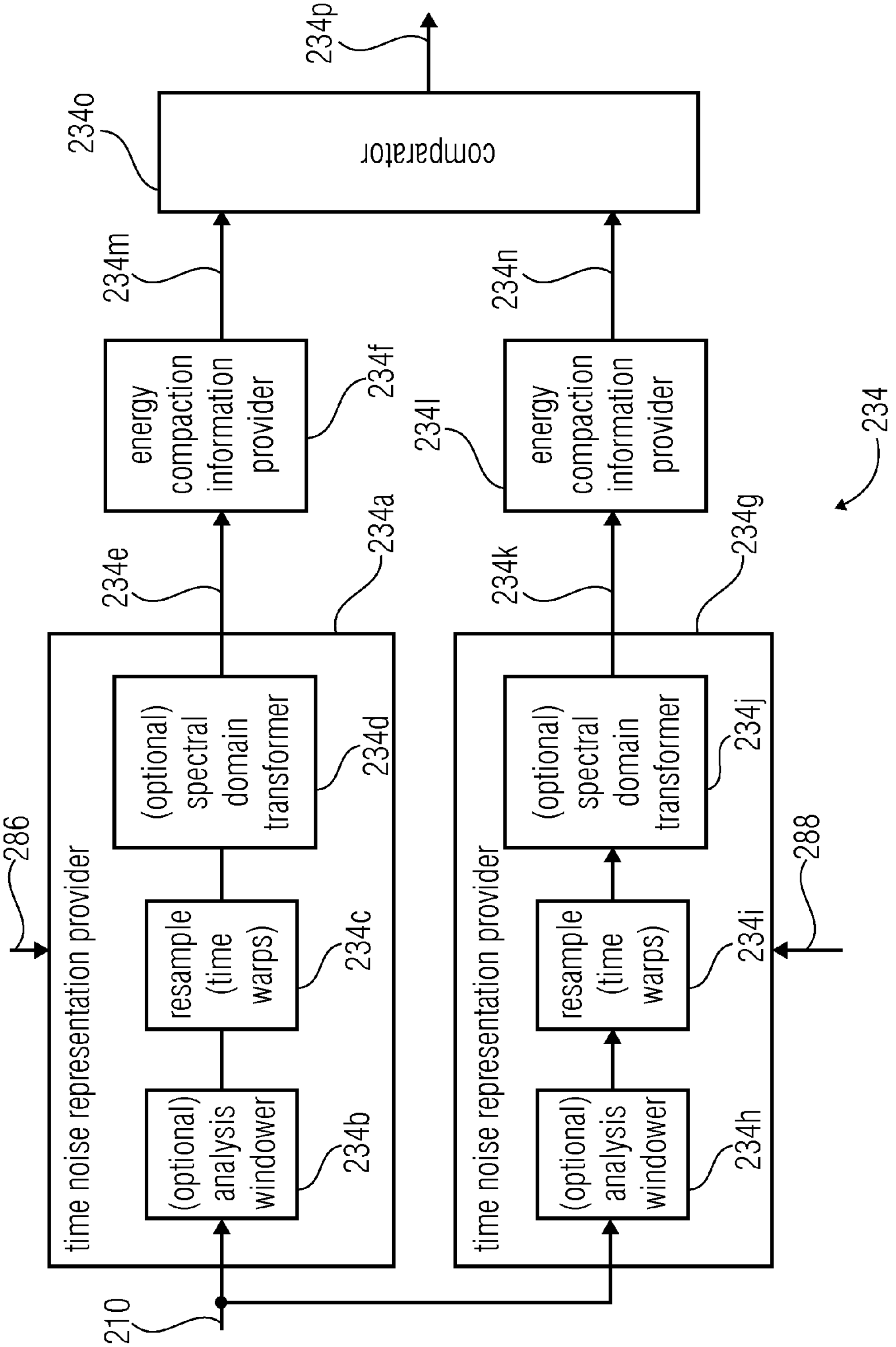
FIG. 2*b* is another a block schematic diagram of a time warp activation signal provider according to an embodiment of the invention.

FIG. 2*b* shows a block schematic diagram of a time warp activation signal provider 234, according to an embodiment of the invention. The time warp activation signal provider 234 may take the role of the time warp activation signal provider 230 in some embodiments. The time warp activation signal provider 234 is configured to receive an input audio signal 210, and two time warp contour information 286 and 288, and provide, on the basis thereof, a time warp activation signal 234*p*. The time warp activation signal 234*p* may take the role of the time warp activation signal 232. The time warp activation signal provider comprises two identical time warp representation providers 234*a*, 234*g*, which are configured to receive the input audio signal 210 and the time warp contour information 286 and 288 respectively and to provide, on the basis thereof, two time warped representations 234*e* and 234*k*, respectively. The time warp activation signal provider 234 further comprises two identical energy compaction information providers 234*f* and 234*l*, which are configured to receive the time warped representations 234*e* and 234*k*, respectively, and, on the basis thereof, provide the energy compaction information 234*m* and 234*n*, respectively. The time warp activation signal provider further comprises a comparator 234*o*, configured to receive the energy compaction information 234*m* and 234*n*, and, on the basis thereof provide the time warp activation signal 234*p*.

In order to facilitate the understanding, it should be noted that the time warp representation providers 234*a* and 234*g* typically comprises (optional) identical analysis windowers 234*b* and 234*h*, identical resamplers or time warpers 234*c* and 234*i*, and (optional) identical spectral domain transformers 234*d* and 234*j*.

In the following, different concepts for obtaining the energy compaction information will be discussed. Beforehand, an introduction will be given explaining the effect of time warping on a typical audio signal.

Figure 3A:
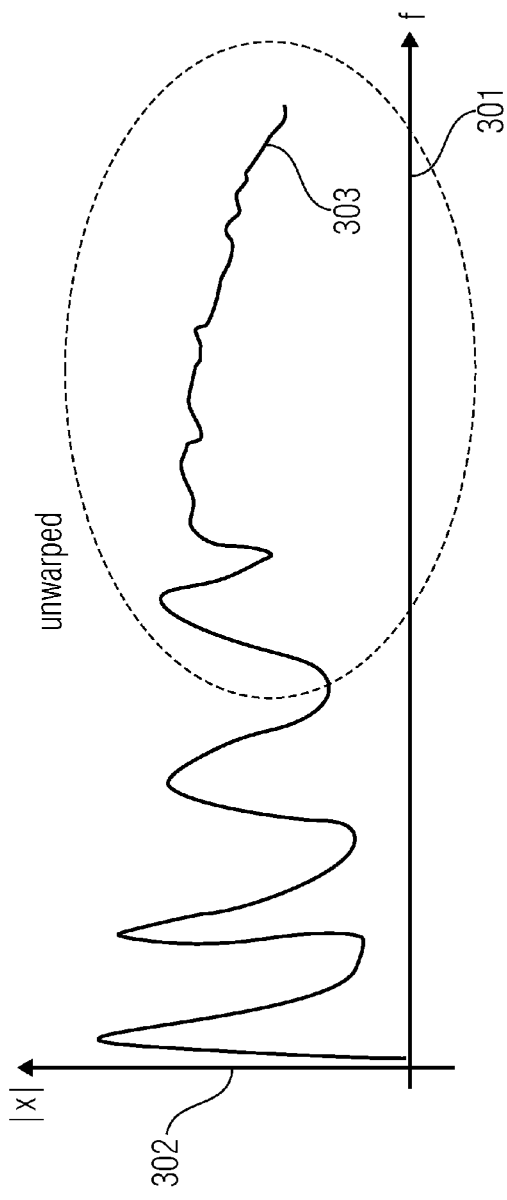
FIG. 3*a* is a graphical representation of a spectrum of an non-time-warped version of an audio signal.

In the following, the effect of time warping on an audio signal will be described taking reference to FIGS. 3*a* and 3*b*. FIG. 3*a* shows a graphical representation of a spectrum of an audio signal. An abscissa 301 describes a frequency and an ordinate 302 describes an intensity of the audio signal. A curve 303 describes an intensity of the non-time-warped audio signal as a function of the frequency f.

Figure 3B:
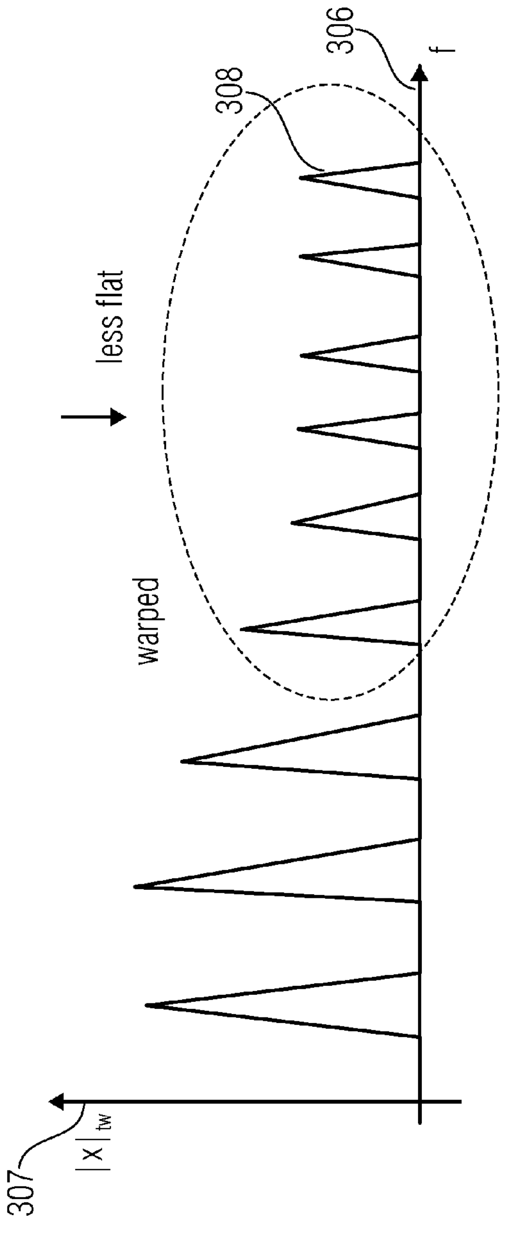
FIG. 3*b* is a graphical representation of a spectrum of a time warped version of the audio signal.

FIG. 3*b* shows a graphical representation of a spectrum of a time warped version of the audio signal represented in FIG. 3*a*. Again, an abscissa 306 describes a frequency and an ordinate 307 describes the intensity of the warped version of the audio signal. A curve 308 describes the intensity of the time warped version of the audio signal over frequency. As can be seen from a comparison of the graphical representation of FIGS. 3*a* and 3*b*, the non-time-warped ("unwarped") version of the audio signal comprises a smeared spectrum, particularly in a higher frequency region. In contrast, the time warped version of the input audio signal comprises a spectrum having clearly distinguishable spectral peaks, even in the higher frequency region. In addition, a moderate sharpening of the spectral peaks can even be observed in the lower spectral region of the time warped version of the input audio signal.

It should be noted that the spectrum of the time warped version of the input audio signal, which is shown in FIG. 3*b*, can be quantized and encoded, for example by the quantizer/encoder 260, with a lower bitrate than the spectrum of the unwarped input audio signal shown in FIG. 3*a*. This is due to the fact that a smeared spectrum typically comprises a large number of perceptually relevant spectral coefficients (i.e. a comparatively small number of spectral coefficients quantized to zero or quantized to small values), while a "less flat" spectrum as shown in FIG. 3 typically comprises a larger number of spectral coefficients quantized to zero or quantized to small values. Spectral coefficients quantized to zero or quantized to small values can be encoded with less bits than spectral coefficients quantized to higher values, such that the spectrum of FIG. 3*b* can be encoded using less bits than the spectrum of FIG. 3*a*.

Nevertheless, it should also be noted that the usage of a time warp does not always result in a significant improvement of the coding efficiency of the time warped signal. Accordingly, in some cases the price, in terms of bitrate, needed for the encoding of the time warp information (e.g. time warp contour) may exceed the savings, in terms of bitrate, for encoding the time warp transformed spectrum (when compared to encoding the non time warp transformed spectrum). In this case, it is advantageous to provide the encoded representation of the audio signal using a standard (non-varying) time warp contour to control the time warp transform. Consequently, the transmission of any time warp information (i.e. time warp contour information) can be omitted (except for a flag indicating the deactivation of the time warping), thereby keeping the bitrate low.

In the following, different concepts for a reliable and computationally efficient calculation of a time warp activation signal 112, 232, 234*p* will be described taking reference to FIGS. 3*c*-3*k*. However, before that, the background of the inventive concept will be briefly summarized.

The basic assumption is that applying the time warping on a harmonic signal with a varying pitch makes the pitch constant, and that making the pitch constant improves the coding of spectra obtained by a following time-frequency transform, because instead of the smearing of the different harmonics over several spectral bins (see FIG. 3*a*) only a limited number of significant lines remain (see FIG. 3*b*). However, even when a pitch variation is detected, the improvement in coding gain (i.e. the amount of bits saved) may be negligible (e.g. if one has strong noise underlying the harmonic signal, or if the variation is so small that the smearing of higher harmonics is no problem), or may be less than the amount of bits needed to transfer the time warp contour to the decoder, or may simply be wrong. In these cases, it is advantageous to reject the varying time warp contour (e.g. 286) produced by a time warp contour encoder and instead use an efficient one-bit signaling, signaling a standard (non-varying) time warp contour.

The scope of the present invention comprises the creation of a method to decide if an obtained time warp contour portion provides enough coding gain (for example enough coding gain to compensate for the overhead needed for the encoding to the time warp contour).

As stated above, the most important aspect of the time warping is the compaction of the spectral energy to a fewer number of lines (see FIGS. 3*a* and 3*b*). One look at this shows that a compaction of energy also corresponds to a more "unflat" spectrum (see FIGS. 3*a* and 3*b*), since the difference between peaks and valleys of the spectrum is increased. The energy is concentrated at fewer lines with the lines in between those having less energy than before.

FIGS. 3*a* and 3*b* show a schematic example with an unwarped spectrum of a frame with strong harmonics and pitch variation (FIG. 3*a*) and the spectrum of the time warped version of the same frame (FIG. 3*b*).

In view of this situation, it has been found that it is advantageous to use the spectral flatness measure as a possible measure for the efficiency of the time warping.

The spectral flatness may be calculated, for example, by dividing the geometric mean of the power spectrum by the arithmetic mean of the power spectrum. For example, the spectral flatness (also designated briefly as "flatness") can be computed according to the following equation:

$$\text{Flatness} = \frac{\sqrt[N]{\prod_{n=0}^{N-1} x(n)}}{\left(\frac{\sum_{n=0}^{N-1} x(n)}{N}\right)}$$

In the above, x(n) represents the magnitude of a bin number n. In addition, in the above, N represents a total number of spectral bins considered for the calculation of the spectral flatness measure.

In an embodiment of the invention, the above-mentioned calculation of the "flatness", which may serve as an energy compaction information, may be performed using the time warp transformed spectrum representations 234*e*, 234*k*, such that the following relationship may hold:

$$x(n)=|X|_{tw}(n).$$

In this case, N may be equal to the number of spectral lines provided by the spectral domain transformer 234*d*, 234*j* and $|X|_{tw}(n)$ is a time warped transformed spectrum representation 234*e*, 234*k*.

Even though the spectral measure is a useful quantity for the provision of the time warp activation signal, one drawback of the spectral flatness measure, like the signal-to-noise ratio (SNR) measure, is that if applied to the whole spectrum, it emphasizes parts with higher energy. Normally, harmonic spectra have a certain spectral tilt, meaning that most of the energy is concentrated at the first few partial tones and then decreases with increasing frequency, leading to an under-representation of the higher partials in the measure. This is not wanted in some embodiments, since it is desired to improve the quality of these higher partials, because they get smeared the most (see FIG. 3*a*). In the following, several optional concepts for the improvement of the relevance of the spectral flatness measure will be discussed.

In an embodiment according to the invention, an approach similar to the so-called "segmental SNR" measure is chosen, leading to a band-wise spectral flatness measure. A calculation of the spectral flatness measure is performed (for example separately) within a number of bands, and main (or mean) is taken. The different bands might have equal bandwidth. However, the bandwidths may follow a perceptual scale, like critical bands, or correspond, for example, to the scale factor bands of the so-called "advanced audio coding", also known as AAC.

Figure 3C:
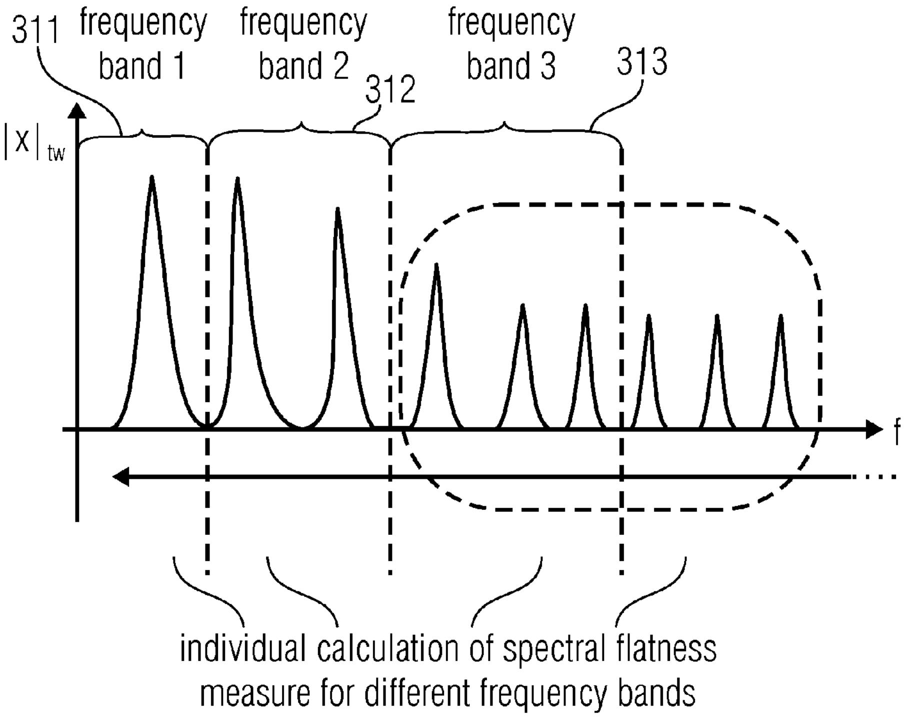
FIG. 3*c* is a graphical representation of an individual calculation of spectral flatness measures for different frequency bands.
Figure 3D:
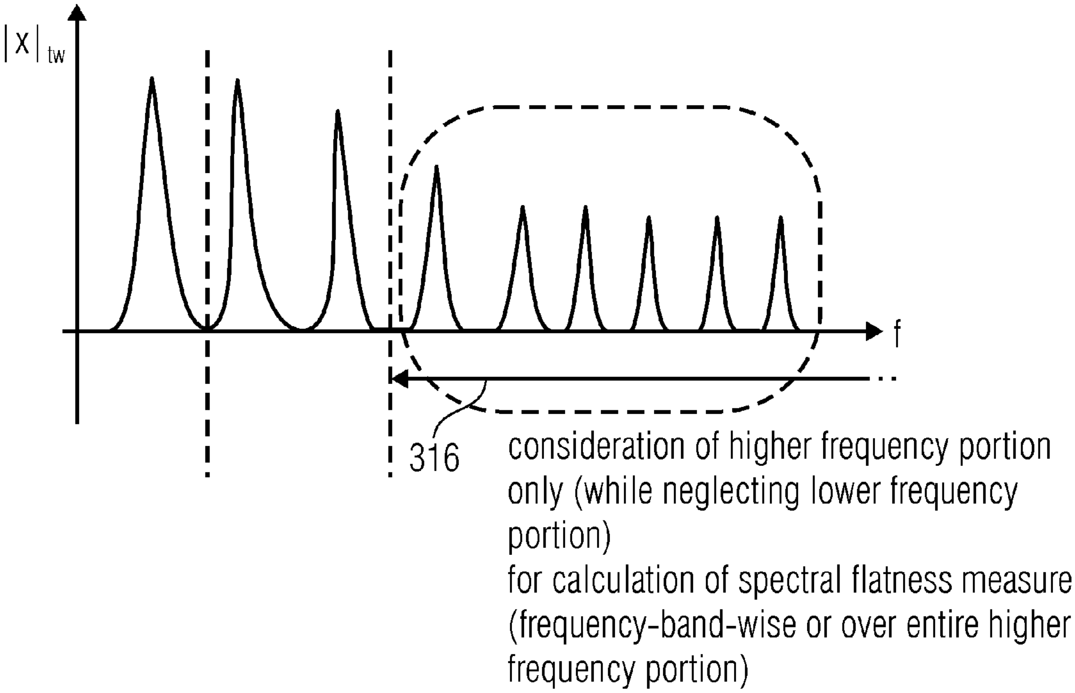
FIG. 3*d* is a graphical representation of a calculation of a spectral flatness measure considering only the higher frequency portion of the spectrum.

The above-mentioned concept will be briefly explained in the following, taking reference to FIG. 3*c*, which shows a graphical representation of an individual calculation of spectral flatness measures for different frequency bands. As can be seen, the spectrum may be divided into different frequency bands 311, 312, 313, which may have an equal bandwidth or which may have different bandwidths. For example, a first spectral flatness measure may be computed for the first frequency band 311, for example, using the equation for the "flatness" given above. In this calculation, the frequency bins of the first frequency band may be considered (running variable n may take the frequency bin indices of the frequency bins of the first frequency band), and the width of the first frequency band 311 may be considered (variable N may take the width in terms of frequency bins of the first frequency band). Accordingly, a flatness measure for the first frequency band 311 is obtained. Similarly, a flatness measure may be computed for the second frequency band 312, taking into consideration the frequency bins of the second frequency bands 312 and also the width of the second frequency band. Further, flatness measures of additional frequency bands, like the third frequency band 313, may be computed in the same way.

Subsequently, an average of the flatness measures for different frequency bands 311, 312, 313 may be computed, and the average may serve as the energy compaction information.

Another approach (for the improvement of the derivation of the time warp activation signal) is to apply the spectral flatness measure only above a certain frequency. Such an approach is illustrated in FIG. 3*b*. As can be seen, only frequency bins in an upper frequency portion 316 of the spectra are considered for a calculation of the spectral flatness measure. A lower frequency portion of the spectrum is neglected for the calculation of the spectral flatness measure. The higher frequency portion 316 may be considered frequency-band-wise for the calculation of the spectral flatness measure. Alternatively, the entire higher frequency portion 316 may be considered in its entirety for the calculation of the spectral flatness measure.

To summarize the above, it can be stated that the decrease in the spectral flatness (caused by the application of the time warp) may be considered as a first measure for the efficiency of the time warping.

For example, the time warp activation signal provider 100, 230, 234 (or the comparator 130, **234*o* thereof) may compare the spectral flatness measure of the time warp transformed spectral representation 234*e* with a spectral flatness measure of the time warp transformed spectral representation 234*k*** using a standard time warp contour information, and to decide on the basis of said comparison whether the time warp activation signal should be active or inactive. For example, the time warp is activated by means of an appropriate setting of the time warp activation signal if the time warping results in a sufficient reduction of the spectral flatness measure when compared to a case without time warping.

Figure 3E:
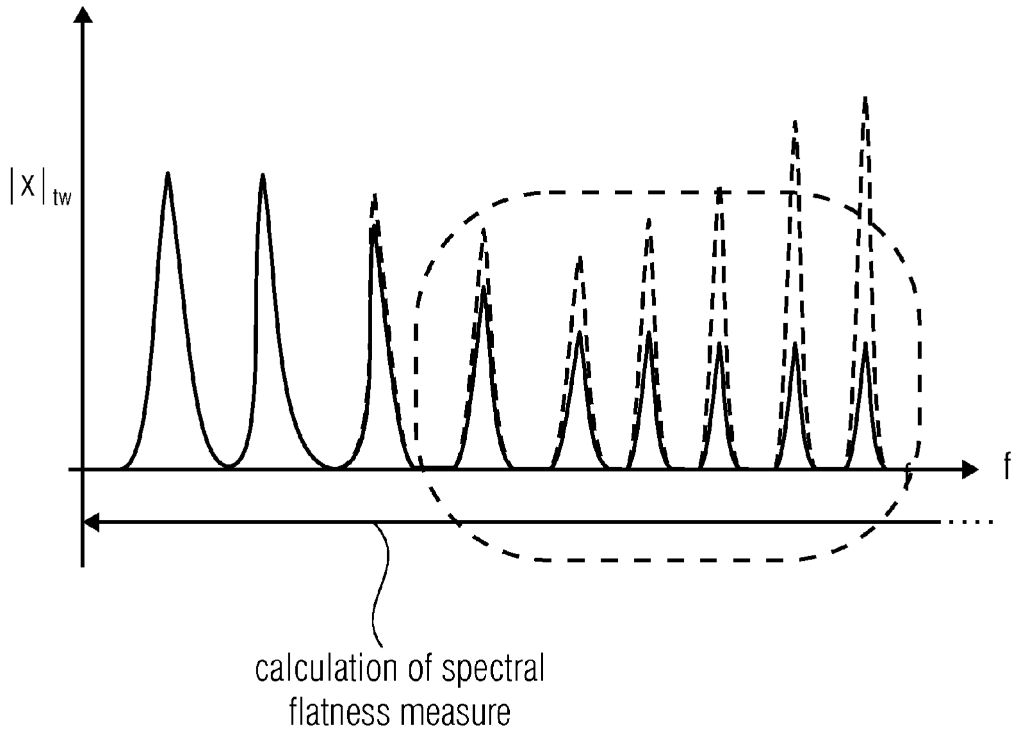
FIG. 3*e* is a graphical representation of a calculation of a spectral flatness measure using a spectrum representation in which a higher frequency portion is emphasized over a lower frequency portion.

In addition to the above mentioned approaches, the upper frequency portion of the spectrum can be emphasized (for example by an appropriate scaling) over the lower frequency portion for the calculation of the spectral flatness measure. FIG. 3*c* shows a graphical representation of a time warp transformed spectrum in which a higher frequency portion is emphasized over a lower frequency portion. Accordingly, an under-representation of higher partials in the spectrum is compensated. Thus, the flatness measure can be computed over the complete scaled spectrum in which higher frequency bins are emphasized over lower frequency bins, as shown in FIG. 3*e*.

In terms of bit savings, a typical measure of coding efficiency would be the perceptual entropy, which can be defined in a way so that it correlates very nicely with the actual number of bits needed to encode a certain spectrum as described in 3GPP TS 26.403 V7.0.0: 3rd Generation Partnership Project; Technical Specification Group Services and System Aspects; General audio codec audio processing functions; Enhanced aacPlus general audio codec; Encoder specification AAC part: Section 5.6.1.1.3 Relation between bit demand and perceptual entropy. As a result, the reduction of the perceptual entropy is another measure for the efficiency of the time warping would be.

Figure 3F:
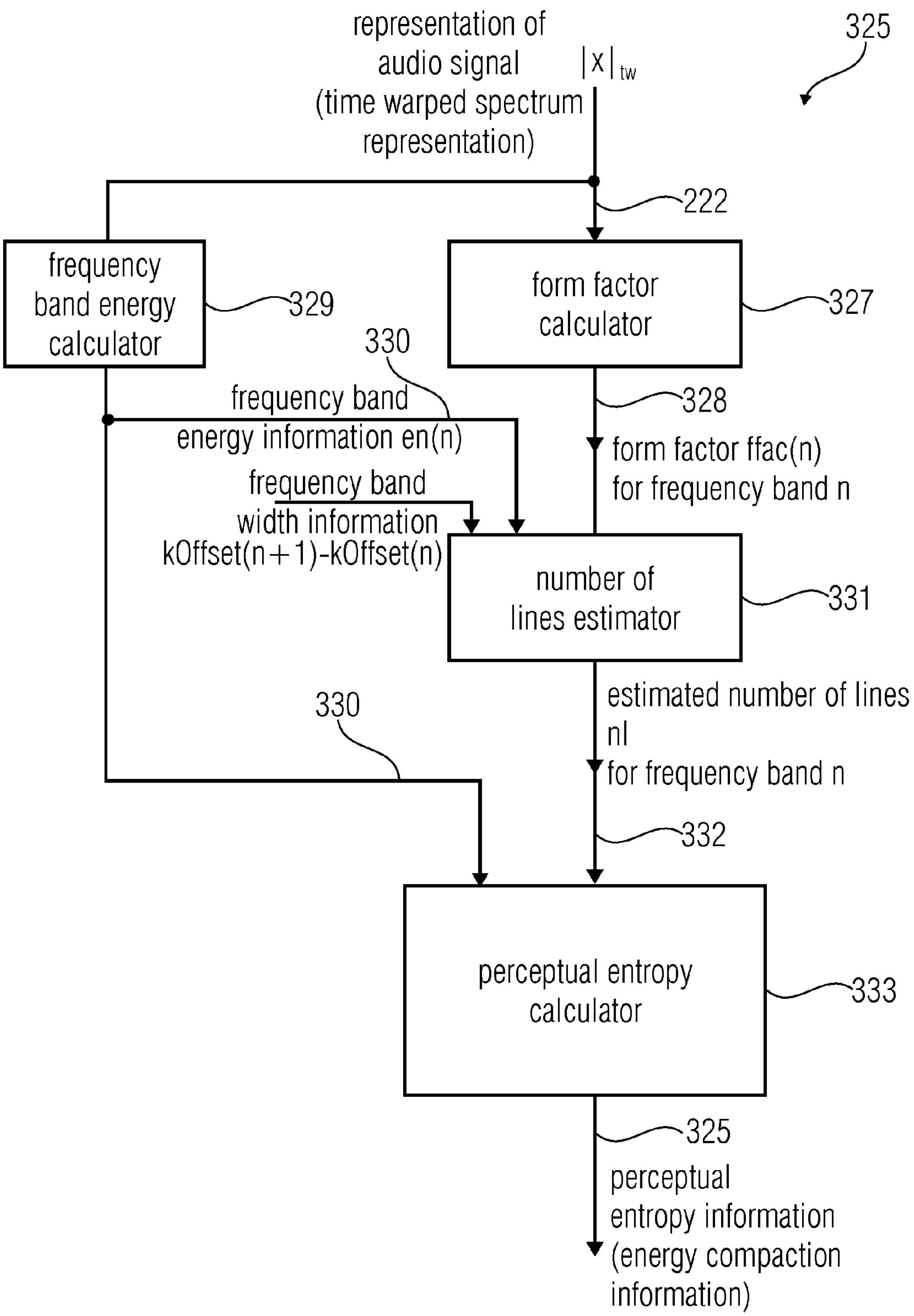
FIG. 3*f* is a block schematic diagram of an energy compaction information provider, according to another embodiment of the invention.

FIG. 3*f* shows an energy compaction information provider 325, which may take the place of the energy compaction information provider 120, **234*f*, 2341, and which may be used in the time warp activation signal providers 100, 290, 234. The energy compaction information provider 325 is configured to receive a representation of the audio signal, for example, in the form of a time-warp transformed spectrum representation 234*e*, 234*k*, also designated with $|X|_{tw}$. The energy compaction information provider 325 is also configured to provide a perceptual entropy information 326, which may take the place of the energy compaction information 122, 234*m*, 234*n***.

The energy compaction information provider 325 comprises a form factor calculator 327, which is configured to receive the time warp transformed spectrum representation **234*e*, 234*k* and to provide, on the basis thereof, a form factor information 328, which may be associated with a frequency band. The energy compaction information provider 325 also comprises a frequency band energy calculator 329, which is configured to calculate a frequency band energy information en(n) (330) on the basis of the time warped spectrum representation 234*e*, 234*k*. The energy compaction information provider 325 also comprises a number of lines estimator 331, which is configured to provide an estimated number of lines information n1 (332) for a frequency band having index n. In addition, the energy compaction information provider 325 comprises a perceptual entropy calculator 333, which is configured to compute the perceptual entropy information 326 on the basis of the frequency band energy information 330 and of the estimated number of lines information 332. For example, the form factor calculator 327** may be configured to compute the form factor according to (1

$$ffac(n) = \sum_{k=kOffset(n)}^{kOffset(n+1)-1} \sqrt{|X(k)|} \quad (1)$$

In the above equation, ffac(n) designates the form factor for the frequency band having a frequency band index n. k designates a running variable, which runs over the spectral bin indices of the scale factor band (or frequency band) n. X(k) designates a spectral value (for example, an energy value or a magnitude value) of the spectral bin (or frequency bin) having a spectral bin index (or a frequency bin index) k.

The number of lines estimator may be configured to estimate the number of nonzero lines, designated with n1, according to the following equation:

$$nl = \frac{ffac(n)}{\left(\frac{en(n)}{kOffset(n+1) - kOffset(n)}\right)^{0.25}} \quad (2)$$

In the above equation, en(n) designates an energy in the frequency band or scale factor band having index n. kOffset (n+1)−kOffset(n) designates a width of the frequency band or scale factor band of index n in terms of frequency bins.

Furthermore, the perceptual entropy calculator 332 may be configured to compute the perceptual entropy information sfbPe according to the following equation:

$$sfbPe = nl \cdot \begin{cases} \log_2\left(\frac{en}{thr}\right) & \text{for } \log_2\left(\frac{en}{thr}\right) \geq c1 \\ \left(c2 + c3 \cdot \log_2\left(\frac{en}{thr}\right)\right) & \text{for } \log_2\left(\frac{en}{thr}\right) < c1 \end{cases} \quad (3)$$

In the above, the following relations may hold:

$$c1=\log_2(8)c2=\log_2(2.5)c3=1-c2/c1, \quad (4)$$

A total perceptual entropy pe may be computed as the sum of the perceptual entropies of multiple frequency bands or scale factor bands.

As mentioned above, the perceptional entropy information 326 may be used as an energy compaction information.

For further details regarding the computation of the perceptual entropy, reference is made to section 5.6.1.1.3 of the International Standard "3GPP TS 26.403 V7.0.0(2006-06)".

In the following, a concept will be described for the computation of the energy compaction information in the time domain.

Another look at the TW-MDCT (time warped modified discrete cosine transform) is the basic idea to change the signal in a way to have a constant or nearly constant pitch within one block. If a constant pitch is achieved, this means that the maxima of the autocorrelation of one process block increase. Since it is not trivial to find corresponding maxima in the autocorrelation for the time warped and non-time-warped case, the sum of the absolute values for the normalized autocorrelation can be used as a measure for the improvement. An increase in this sum corresponds to an increase in the energy compaction.

This concept will be explained in more detail in the following, taking reference to FIGS. 3*g*, 3*h*, 3*i*, 3*j* and 3*k*.

Figure 3G:
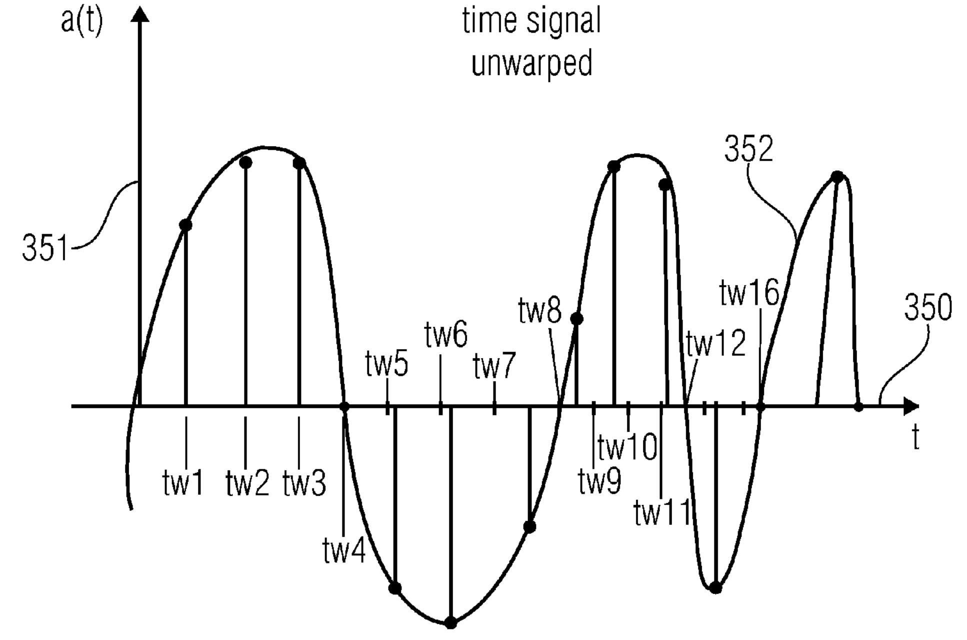
FIG. 3*g* is a graphical representation of an audio signal having a temporally variable pitch in the time domain.

FIG. 3*g* shows a graphical representation of an non-time-warped signal in the time domain. An abscissa 350 describes the time, and an ordinate 351 describes a level a(t) of the non-time-warped time signal. A curve 352 describes the temporal evolution of the non-time-warped time signal. It is assumed that the frequency of the non-time-warped time signal described by the curve 352 increases over time, as can be seen in FIG. 3*g*.

Figure 3H:
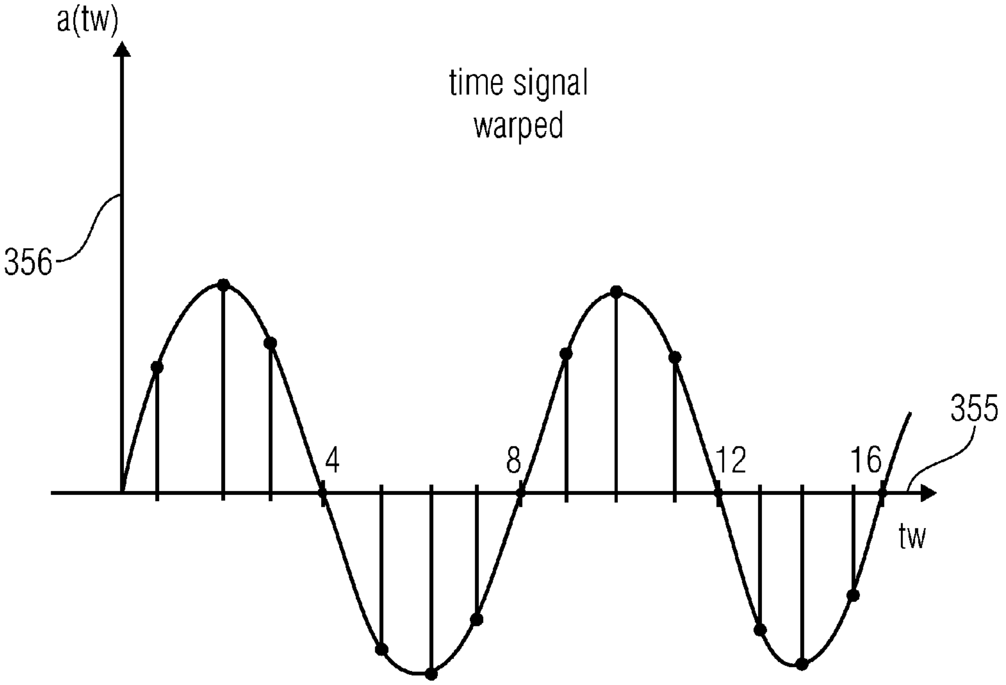
FIG. 3*h* is a graphical representation of a time warped (non-uniformly resampled) version of the audio signal of FIG. 3*g;*

FIG. 3*h* shows a graphical representation of a time warped version of the time signal of FIG. 3*g*. An abscissa 355 describes the warped time (for example, in a normalized form) and an ordinate 356 describes the level of the time warped version $a(t_w)$ of the signal a(t). As can be seen in FIG. 3*h*, the time warped version $a(t_w)$ of the non-time-warped time signal a(t) comprises (at least approximately) a temporally constant frequency in the warped time domain.

In other words, FIG. 3*h* illustrates the fact that a time signal of a temporally varying frequency is transformed into a time signal of a temporally constant frequency by an appropriate time warped operation, which may comprise a time-warping re-sampling.

Figure 3I:
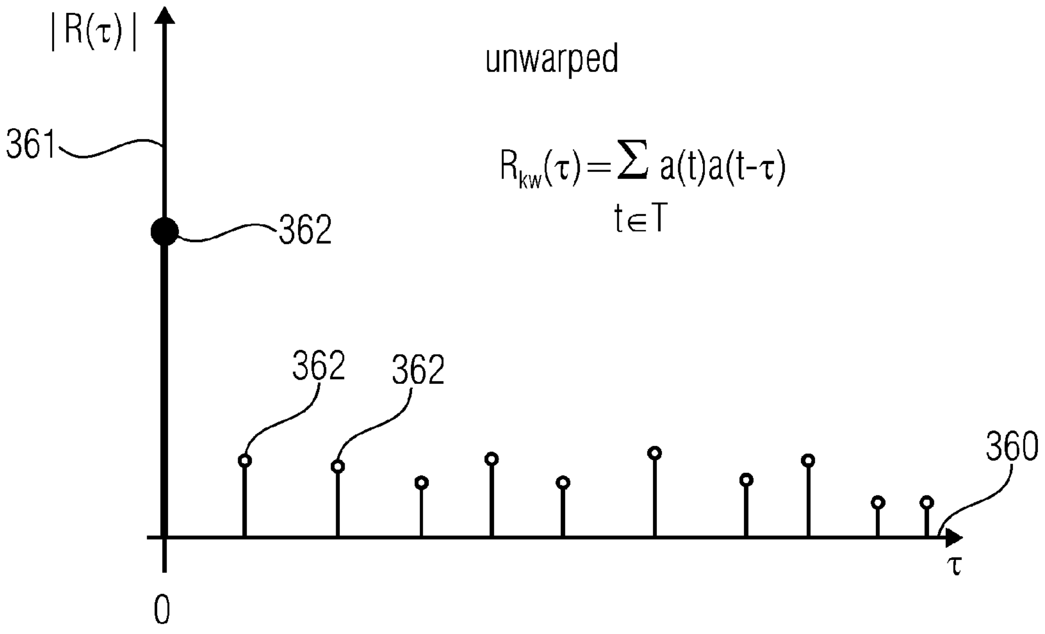
FIG. 3*i* is a graphical representation of an autocorrelation function of the audio signal according to FIG. 3*g;*

FIG. 3*i* shows a graphical representation of an autocorrelation function of the unwarped time signal a(t). An abscissa 360 describes an autocorrelation lag τ, and an ordinate 361 describes a magnitude of the autocorrelation function. Marks 362 describe an evolution of the autocorrelation function $R_{uw}(t)$ as a function of the autocorrelation lag τ. As can be seen from FIG. 3*i*, the autocorrelation function $R_{uw}$ of the unwarped time signal a(t) comprises a peak for τ=0 (reflecting the energy of the signal a(t)) and takes small values for τ≠0.

Figure 3J:
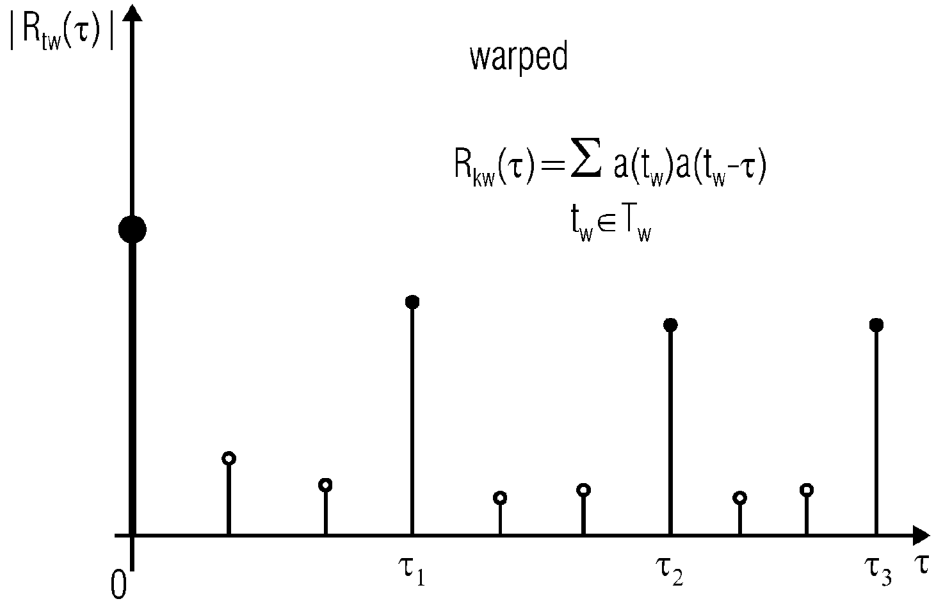
FIG. 3*j* is a graphical representation of an autocorrelation function of the audio signal according to FIG. 3*h;*

FIG. 3*j* shows a graphical representation of the autocorrelation function $R_{tw}$ of the time warped time signal $a(t_w)$. As can be seen from FIG. 3*j*, the autocorrelation function $R_{tw}$ comprises a peak for τ=0, and also comprises peaks for other values $\tau_1$, $\tau_2$, $\tau_3$ of the autocorrelation lag τ. These additional peaks for $\tau_1$, $\tau_2$, $\tau_3$ are obtained by the effect of the time warp to increase the periodicity of the time warped time signal $a(t_w)$. This periodicity is reflected by the additional peaks of the autocorrelation function $R_{tw}(t)$ when compared to the autocorrelation function $R_{uW}(\tau)$. Thus, the presence of additional peaks (or the increased intensity of peaks) of the autocorrelation function of the time warped audio signal, when compared to the autocorrelation function of the original audio signal can be used as an indication of the effectiveness (in terms of a bitrate reduction) of the time warp.

Figure 3K:
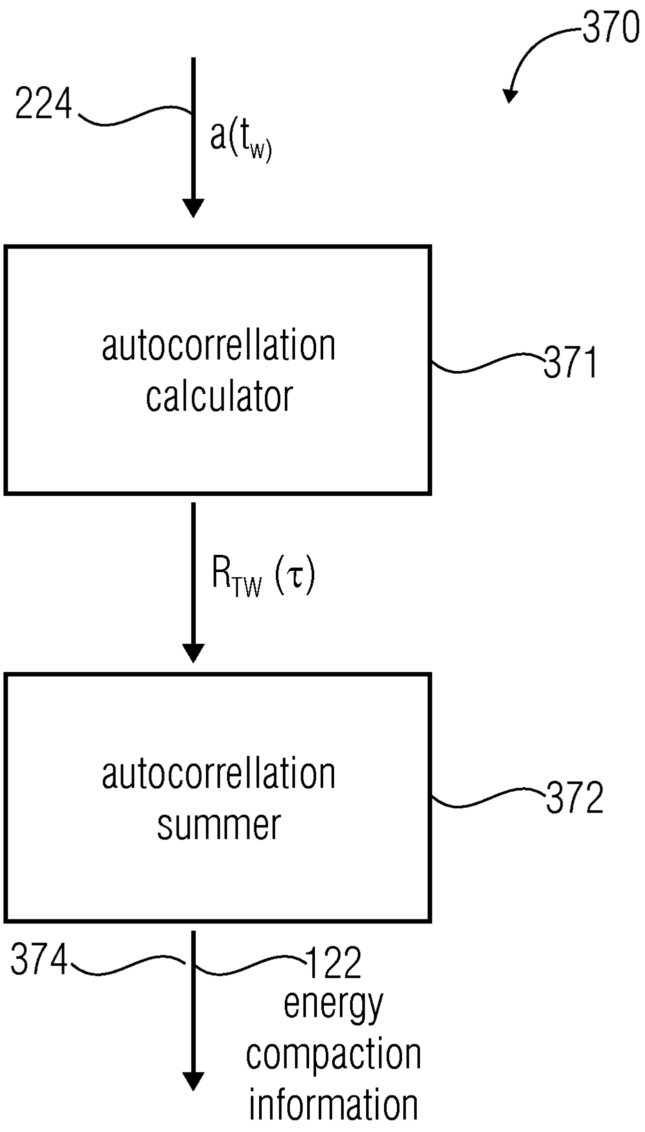
FIG. 3*k* is a block schematic diagram of an energy compaction information provider, according to another embodiment of the invention.

FIG. 3*k* shows a block schematic diagram of an energy compaction information provider 370 configured to receive a time warped time domain representation of the audio signal, for example, the time warped signal 234*e*, 234*k* (where the spectral domain transform 234*d*, 234*j* and optionally the analysis windower 234*b* and 234*h* is omitted), and to provide, on the basis thereof, an energy compaction information 374, which may take the role of the energy compaction information 372. The energy compaction information provider 370 of FIG. 3*k* comprises an autocorrelation calculator 371 configured to compute the autocorrelation function $R_{tw}(t)$ of the time warped signal $a(t_w)$ over a predetermined range of discrete values of τ. The energy compaction information provider 370 also comprises an autocorrelation summer 372 configured to sum a plurality of values of the autocorrelation function $R_{tw}(t)$ (for example, over a predetermined range of discrete values of τ) and to provide the obtained sum as the energy compaction information 122, 234*m*, 234*n*.

Thus, the energy compaction information provider 370 allows the provision of a reliable information indicating the efficiency of the time warp without actually performing the spectral domain transformation of the time warped time domain version of the input audio signal 210. Therefore, it is possible to perform a spectral domain transformation of the time warped version of the input audio signal 310 only if it is found, on the basis of the energy compaction information 122, 234*m*, 234*n* provided by the energy compaction information provider 370, that the time warp actually brings along an improved encoding efficiency.

To summarize the above, embodiments according to the invention create a concept for a final quality check. A resulting pitch contour (used in a time warp audio signal encoder) is evaluated in terms of its coding gain and either accepted or rejected. Several measurements concerning the sparsity of the spectrum or the coding gain may be taken into account for this decision, for example, a spectral flatness measure, a band-wise segmental spectral flatness measure, and/or a perceptual entropy.

The usage of different spectral compaction information has been discussed, for example, the usage of a spectral flatness measure, the usage of a perceptual entropy measure, and the usage of a time domain autocorrelation measure. Nevertheless, there are other measures that show a compaction of the energy in a time warped spectrum.

All these measures can be used. For all these measures, a ratio between the measure for an unwarped and a time warped spectrum is defined, and a threshold is set for this ratio in the encoder to determine if an obtained time warp contour has benefit in the encoding or not.

All these measures may be applied to a full frame, where only the third portion of the pitch contour is new (wherein, for example, three portions of the pitch contour are associated with the full frame), or only for the portion of the signal, for which this new portion was obtained, for example, using a transform with a low overlap window centered on the (respective) signal portion.

Naturally, a single measure or a combination of the above-mentioned measures may be used, as desired.

Figure 4A:
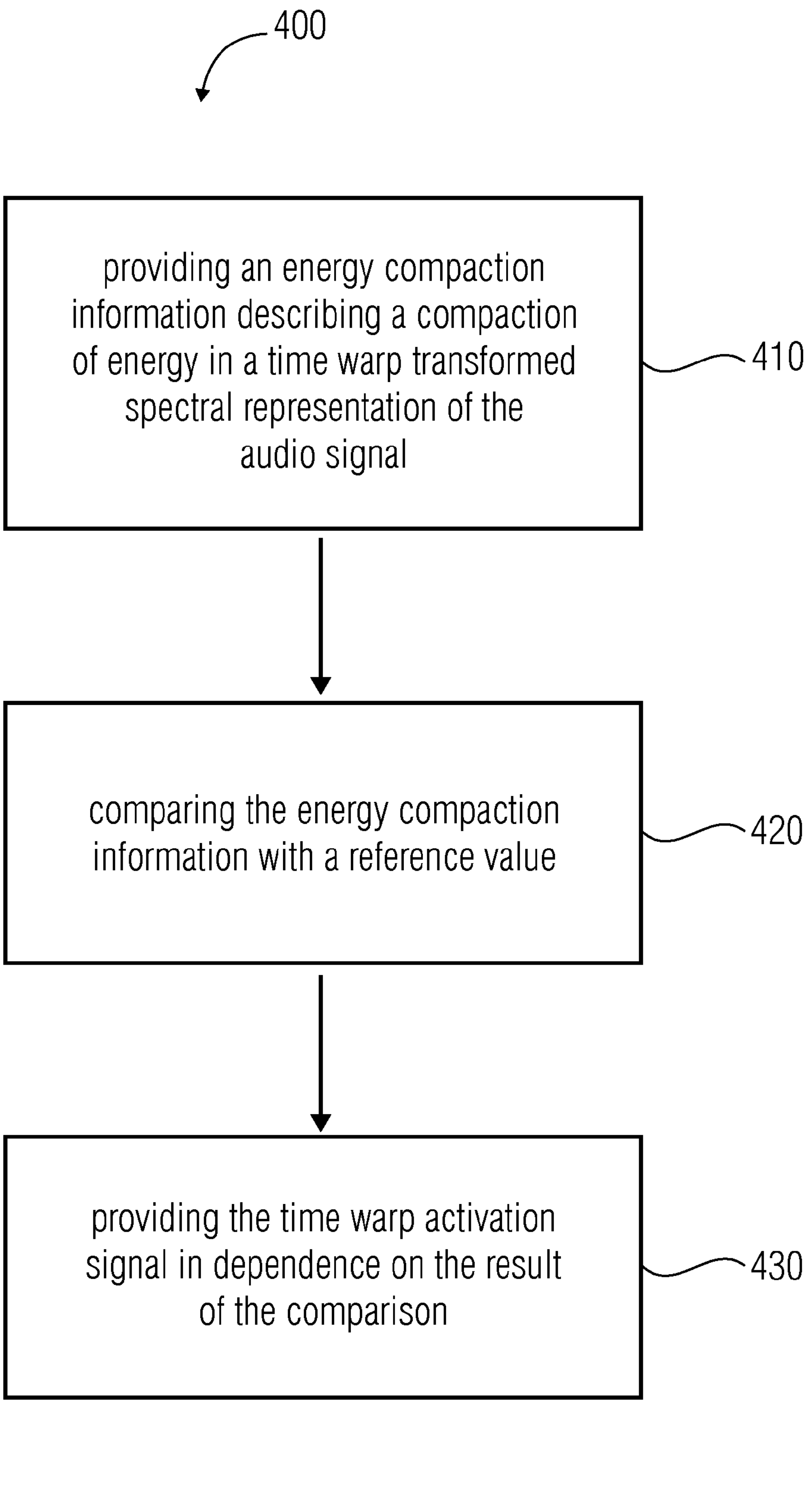
FIG. 4*a* is a flowchart of a method for providing a time warp activation signal on the basis of an audio signal.

FIG. 4*a* shows a flow chart of a method for providing a time warp activation signal on the basis of an audio signal. The method 400 of FIG. 4*a* comprises a step 410 of providing an energy compaction information describing a compaction of energy in a time-warp transformed spectral representation of the audio signal. The method 400 further comprises a step 420 of comparing the energy compaction information with a reference value. The method 400 also comprises a step 430 of providing the time warp activation signal in dependence on the result of the comparison.

The method 400 can be supplemented by any of the features and functionalities described herein with respect to the provision of the time warp activation signal.

Figure 4B:
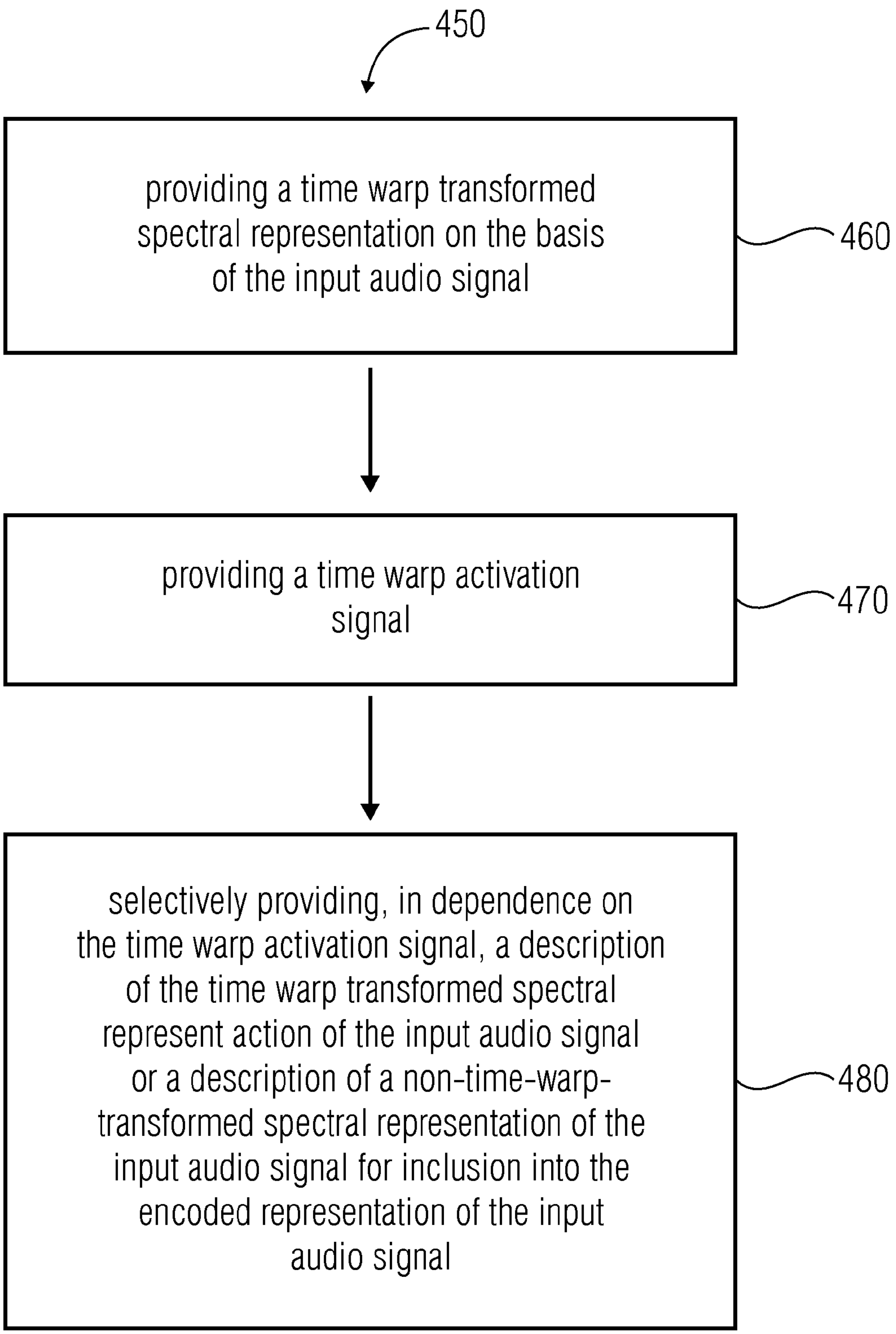
FIG. 4*b* is a flowchart of a method for encoding an input audio signal to obtain an encoded representation of the input audio signal, according to an embodiment of the invention.

FIG. 4*b* shows a flow chart of a method for encoding an input audio signal to obtain an encoded representation of the input audio signal. The method 450 optionally comprises a step 460 of providing a time warp transformed spectral representation on the basis of the input audio signal. The method 450 also comprises a step 470 of providing a time warp activation signal. The step 470 may, for example, comprise the functionality of the method 400. Thus, the energy compaction information may be provided such that the energy compaction information describes a compaction of energy in the time warp transformed spectrum representation of the input audio signal. The method 450 also comprises a step 480 of selectively providing, in dependence on the time warp activation signal, a description of the time warp transformed spectral representation of the input audio signal using a newly found time warp contour information or description of a non-time-warp-transformed spectral representation of the input audio signal using a standard (non-varying) time warp contour information for inclusion into the encoded representation of the input audio signal.

The method 450 can be supplemented by any of the features and functionalities discussed herein with respect to the encoding of the input audio signal.

FIG. 5 illustrates an embodiment of an audio encoder in accordance with the present invention, in which several aspects of the present invention are implemented. An audio signal is provided at an encoder input 500. This audio signal will typically be a discrete audio signal which has been derived from an analog audio signal using a sampling rate which is also called the normal sampling rate. This normal sampling rate is different from a local sampling rate generated in a time warping operation, and the normal sampling rate of the audio signal at input 500 is a constant sampling rate resulting in audio samples separated by a constant time portion. The signal is put into an analysis windower 502, which is, in this embodiment, connected to a window function controller 504. The analysis windower 502 is connected to a time warper 506. Depending on the implementation, however, the time warper 506 can be placed—in a signal processing direction—before the analysis windower 502. This implementation is advantageous, when a time warping characteristic is needed for analysis windowing in block 502, and when the time warping operation is to be performed on time warped samples rather than unwarped samples. Specifically in the context of MDCT-based time warping as described in Bernd Edler et al., "Time Warped MDCT", International Patent Application PCT/EP2009/002118. For other time warping applications such as described in L. Villemoes, "Time Warped Transform Coding of Audio Signals", PCT/EP2006/010246, Int. patent application, November 2005, the placement between the time warper 506 and the analysis windower 502 can be set as needed. Additionally, a time/frequency converter 508 is provided for performing a time/frequency conversion of a time warped audio signal into a spectral representation. The spectral representation can be input into a TNS (temporal noise shaping) stage 510, which provides, as an output 510*a*, TNS information and, as an output 510*b*, spectral residual values. Output 510*b* is coupled to a quantizer and coder block 512 which can be controlled by a perceptual model 514 for quantizing a signal so that the quantization noise is hidden below the perceptual masking threshold of the audio signal.

Figure 5A:
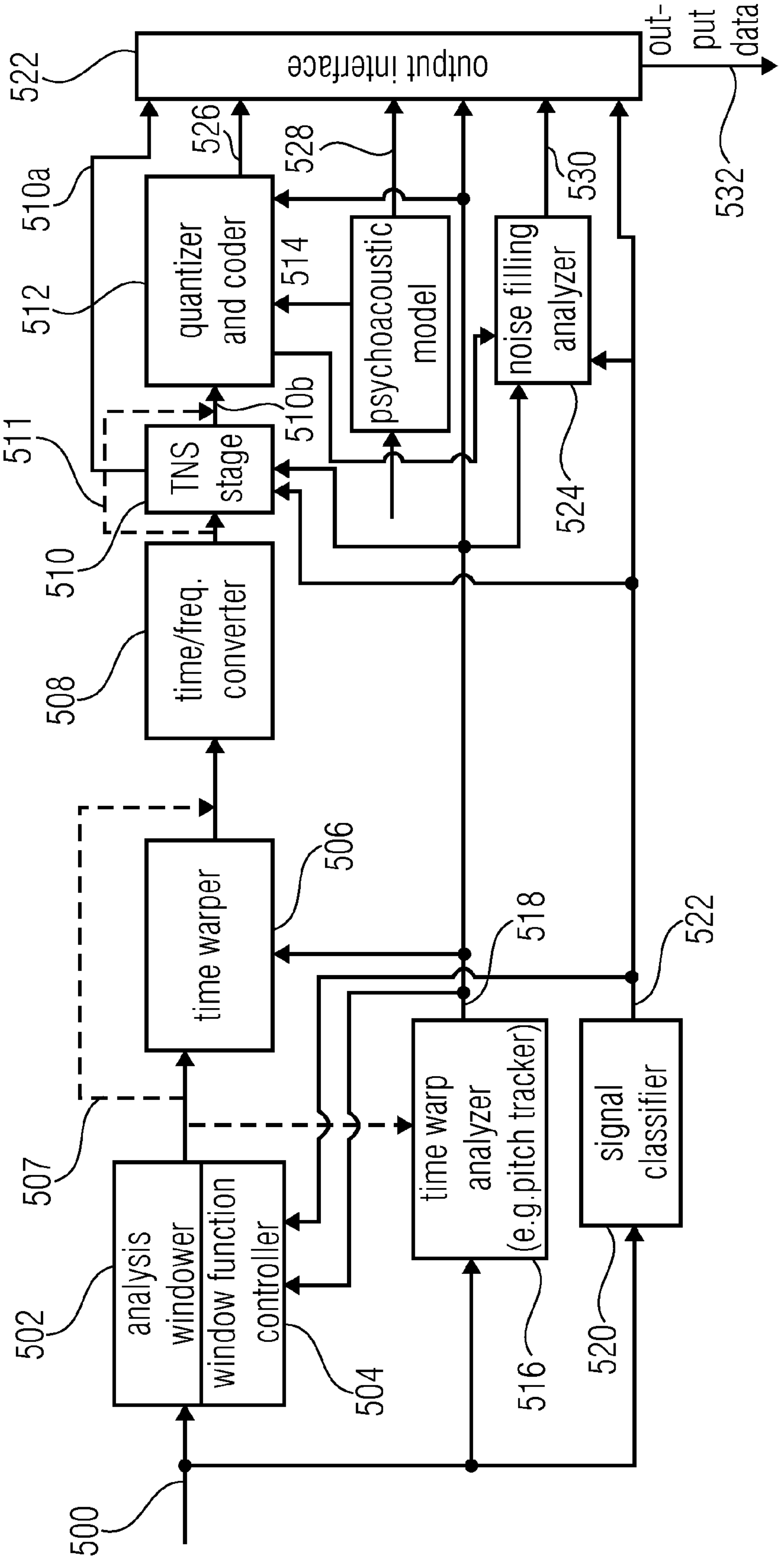
FIG. 5*a* is an embodiment of an audio encoder having inventive aspects.

Additionally, the encoder illustrated in FIG. 5*a* comprises a time warp analyzer 516, which may be implemented as a pitch tracker, which provides a time warping information at output 518. The signal on line 518 may comprise a time warping characteristic, a pitch characteristic, a pitch contour, or an information, whether the signal analyzed by the time warp analyzer is a harmonic signal or a non-harmonic signal. The time warp analyzer can also implement the functionality for distinguishing between voiced speech and unvoiced speech. However, depending on the implementation, and whether a signal classifier 520 is implemented, the voiced/unvoiced decision can also be done by the signal classifier 520. In this case, the time warp analyzer does not necessarily have to perform the same functionality. The time warp analyzer output 518 is connected to at least one and advantageously more than one functionalities in the group of functionalities comprising the window function controller 504, the time warper 506, the TNS stage 510, the quantizer and coder 512 and an output interface 522.

Analogously, an output 522 of the signal classifier 520 can be connected to one or more of the functionalities of a group of functionalities comprising the window function controller

504, the TNS stage 510, a noise filling analyzer 524 or the output interface 522. Additionally, the time warp analyzer output 518 can also be connected to the noise filling analyzer 524.

Although FIG. 5*a* illustrates a situation, where the audio signal on analysis windower input 500 is input into the time warp analyzer 516 and the signal classifier 520, the input signals for these functionalities can also be taken from the output of the analysis windower 502 and, with respect to the signal classifier, can even be taken from the output of the time warper 506, the output of the time/frequency converter 508 or the output of the TNS stage 510.

In addition to a signal output by the quantizer encoder 512 indicated at 526, the output interface 522 receives the TNS side information 510*a*, a perceptual model side information 528, which may include scale factors in encoded form, time warp indication data for more advanced time warp side information such as the pitch contour on line 518 and signal classification information on line 522. Additionally, the noise filling analyzer 524 can also output noise filling data on output 530 into the output interface 522. The output interface 522 is configured for generating encoded audio output data on line 532 for transmission to a decoder or for storing in a storage device such as memory device. Depending on the implementation, the output data 532 may include all of the input into the output interface 522 or may comprise less information, provided that the information is not needed by a corresponding decoder, which has a reduced functionality, or provided that the information is already available at the decoder due to a transmission via a different transmission channel.

The encoder illustrated in FIG. 5*a* may be implemented as defined in detail in the MPEG-4 standard apart from additional functionalities illustrated in the inventive encoder in FIG. 5*a* represented by the window function controller 504, the noise filling analyzer 524, the quantizer encoder 512 and the TNS stage 510, which have, compared to the MPEG-4 standard, an advanced functionality. A further description is in the AAC standard (international standard 13818-7) or 3GPP TS 26.403 V7.0.0: Third generation partnership project; technical specification group services and system aspect; general audio codec audio processing functions; enhanced AAC plus general audio codec.

Figure 5B:
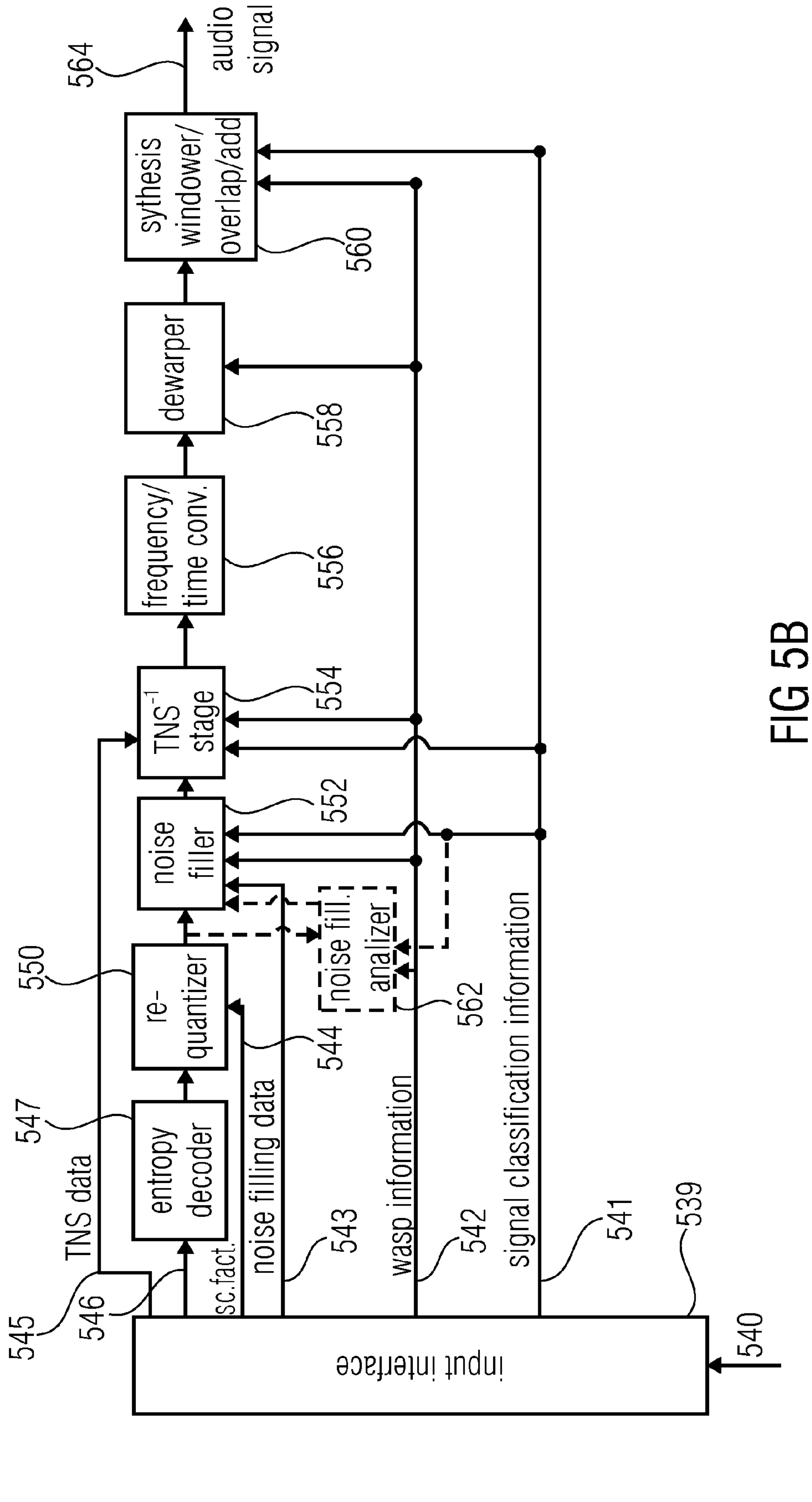
FIG. 5*b* is an embodiment of an audio decoder having inventive aspects.

Subsequently, FIG. 5*b* is discussed, which illustrates an embodiment of an audio decoder for decoding an encoded audio signal received via input 540. The input interface 540 is operative to process the encoded audio signal so that the different information items of information are extracted from the signal on line 540. This information comprises signal classification information 541, time warp information 542, noise filling data 543, scale factors 544, TNS data 545 and encoded spectral information 546. The encoded spectral information is input into an entropy decoder 547, which may comprise a Huffman decoder or an arithmetic decoder, provided that the encoder functionality in block 512 in FIG. 5*a* is implemented as a corresponding encoder such as a Huffman encoder or an arithmetic encoder. The decoded spectral information is input into a re-quantizer 550, which is connected to a noise filler 552. The output of the noise filler 552 is input into an inverse TNS stage 554, which additionally receives the TNS data on line 545. Depending on the implementation, the noise filler 552 and the TNS stage 554 can be applied in different order so that the noise filler 552 operates on the TNS stage 554 output data rather than on the TNS input data. Additionally, a frequency/time converter 556 is provided, which feeds a time dewarper 558. At the output of the signal processing chain, a synthesis windower performing an overlap/add processing is applied as indicated at 560. The order of the time dewarper 558 and the synthesis stage 560 can be changed, but, in the embodiment, it is advantageous to perform an MDCT-based encoding/decoding algorithm as defined in the AAC standard (AAC=advanced audio coding). Than, the inherent cross-fade operation from one block to the next due to the overlap/add procedure is advantageously used as the last operation in the processing chains so that all blocking artifacts are effectively avoided.

Additionally, a noise filling analyzer 562 is provided, which is configured for controlling the noise filler 552 and which receives as an input, time warp information 542 and/or signal classification information 541 and information on the re-quantized spectrum, as the case may be.

All functionalities described hereafter are applied together in an enhanced audio encoder/decoder scheme. Nevertheless, the functionalities described hereafter can also be applied independently on each other, i.e., so that only one or a group, but not all of the functionalities are implemented in a certain encoder/decoder scheme.

Subsequently, the noise filling aspect of the present invention is described in detail.

In an embodiment, the additional information provided by the time warping/pitch contour tool 516 in FIG. 5*a* is used beneficially for controlling other codec tools and, specifically, the noise filling tool implemented by the noise filling analyzer 524 on the encoder side and/or implemented by the noise filling analyzer 562 and the noise filler 552 on the decoder side.

Several encoder tools within the AAC frame work such as a noise filling tool are controlled by information gathered by the pitch contour analysis and/or by an additional knowledge of a signal classification provided by the signal classifier 520.

A found pitch contour indicates signal segments with a clear harmonic structure, so the noise filling in between the harmonic lines might decrease the perceived quality, especially on speech signals, therefore the noise level is reduced, when a pitch contour is found. Otherwise, there would be noise between the partial tones, which has the same effect as the increased quantization noise for a smeared spectrum. Furthermore, the amount of the noise level reduction can be further refined by using the signal classifier information, so e.g. for speech signals there would be no noise filling and a moderate noise filling would be applied to generic signals with a strong harmonic structure.

Generally, the noise filler 552 is useful for inserting spectral lines into a decoded spectrum, where zeroes have been transmitted from an encoder to a decoder, i.e., where the quantizer 512 in FIG. 5*a* has quantized spectral lines to zero. Naturally, quantizing spectral lines to zero greatly reduced the bitrate of the transmitted signal, and, in theory, the elimination of these (small) spectral lines is not audible, when these spectral lines are below the perceptual masking threshold as determined by the perceptual model 514. Nevertheless, it has been found that these "spectral holes", which can include many adjacent spectral lines result in a quite unnatural sound. Therefore, a noise filling tool is provided for inserting spectral lines at positions, where lines have been quantized to zero by an encoder-side quantizer. These spectral lines may have a random amplitude or phase, and these decoder-side synthesized spectral lines are scaled using a noise filling measure determined on the encoder-side as illustrated in FIG. 5*a* or depending on a measure determined on the decoder-side as illustrated in FIG. 5*b* by optional block 562. The noise filling analyzer 524 in FIG. 5*a* is, therefore, configured for estimating a noise filling measure of an energy of audio values quantized to zero for a time frame of the audio signal.

In an embodiment of the present invention, the audio encoder for encoding an audio signal on line 500 comprises the quantizer 512 which is configured for quantizing audio values, where the quantizer 512 is furthermore configured to quantize to zero audio values below a quantization threshold. This quantization threshold may be the first step of a step-based quantizer, which is used for the decision, whether a certain audio value is quantized to zero, i.e., to a quantization index of zero, or is quantized to one, i.e., a quantization index of one indicating that the audio value is above this first threshold. Although the quantizer in FIG. 5*a* is illustrated as performing the quantization of frequency domain values, the quantizer can also be used for quantizing time domain values in an alternative embodiment, in which the noise filling is performed in the time domain rather than the frequency domain.

The noise filling analyzer 524 is implemented as a noise filling calculator for estimating a noise filling measure of an energy of audio values quantized to zero for a time frame of the audio signal by the quantizer 512. Additionally, the audio encoder comprises an audio signal analyzer 600 illustrated in FIG. 6*a*, which is configured for analyzing, whether the time frame of the audio signal has a harmonic characteristic or a speech characteristic. The signal analyzer 600 can, for example, comprise block 516 of FIG. 5*a* or block 520 of FIG. 5*a* or can comprise any other device for analyzing, whether a signal is a harmonic signal or a speech signal. Since the time warp analyzer 516 is implemented to look for a pitch contour, and since the presence of a pitch contour indicates a harmonic structure of the signal, the signal analyzer 600 in FIG. 6*a* can be implemented as a pitch tracker or a time warping contour calculator of a time warp analyzer.

Figures 6A, 6B:
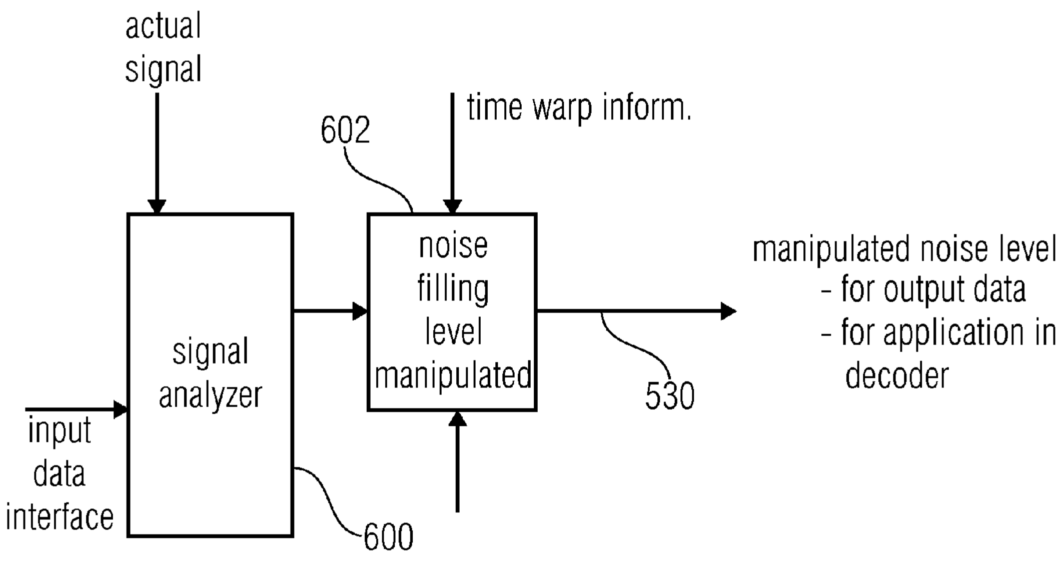
FIG. 6*a* is an embodiment of the noise filling aspect of the present invention.
FIG. 6*b* is a table defining the control operation performed by the noise filling level manipulator.

The audio encoder additionally comprises a noise filling level manipulator 602 illustrated in FIG. 6*a*, which outputs a manipulated noise filling measure/level to be output to the output interface 522 indicated at 530 in FIG. 5*a*. The noise filling measure manipulator 602 is configured for manipulating the noise filling measure depending on the harmonic or speech characteristic of the audio signal. The audio encoder additionally comprises the output interface 522 for generating an encoded signal for transmission or storage, the encoded signal comprising the manipulated noise filling measure output by block 602 on line 530. This value corresponds to the value output by block 562 in the decoder-side implementation illustrated in FIG. 5*b*.

As indicated in FIG. 5*a* and FIG. 5*b*, the noise filling level manipulation can either be implemented in an encoder or can be implemented in a decoder or can be implemented in both devices together. In a decoder-side implementation, the decoder for decoding an encoded audio signal comprises the input interface 539 for processing the encoded signal on line 540 to obtain a noise filling measure, i.e., the noise filling data on line 543, and encoded audio data on line 546. The decoder additionally comprises a decoder 547 and re-quantizer 550 for generating re-quantized data.

Additionally, the decoder comprises a signal analyzer 600 (FIG. 6*a*) which may be implemented in the noise filling analyzer 562 in FIG. 5*b* for retrieving information, whether a time frame of the audio data has a harmonic or speech characteristic.

Additionally, the noise filler 552 is provided for generating noise filling audio data, wherein the noise filler 552 is configured to generate the noise filling data in response to the noise filling measure transmitted via the encoded signal and generated by the input interface at line 543 and the harmonic or speech characteristic of the audio data as defined by the signal analyzers 516 and/or 550 on the encoder side or as defined by item 562 on the decoder side via processing and interpreting the time warp information 542 indicating, whether a certain time frame has been subjected to a time warping processing or not.

Additionally, the decoder comprises a processor for processing the re-quantized data and the noise filling audio data to obtain a decoded audio signal. The processor may include items 554, 556, 558, 560 in FIG. 5*b* as the case may be. Additionally, depending on the specific implementation of the encoder/decoder algorithm, the processor can include other processing blocks, which are provided, for example, in a time domain encoder such as the AMR WB+ encoder or other speech coders.

The inventive noise filling manipulation can, therefore, be implemented on the encoder side only by calculating the straightforward noise measure and by manipulating this noise measure based on harmonic/speech information and by transmitting the already correct manipulated noise filling measure which can then be applied by a decoder in a straightforward manner. Alternatively, the non-manipulated noise filling measure can be transmitted from an encoder to a decoder, and the decoder will then analyze, whether the actual time frame of an audio signal has been time warped, i.e., has a harmonic or speech characteristic so that the actual manipulation of the noise filling measure takes place on the decoder-side.

Subsequently, FIG. 6*b* is discussed in order to explain embodiments for manipulating the noise level estimate.

In the first embodiment, a normal noise level is applied, when the signal does not have an harmonic or speech characteristic. This is the case, when no time warp is applied. When, additionally, a signal classifier is provided, then the signal classifier distinguishing between speech and no speech would indicate no speech for the situation, where time warp was not active, i.e., where no pitch contour was found.

When, however, the time warp was active, i.e., when a pitch contour was found, which indicates an harmonic content, then the noise filling level would be manipulated to be lower than in the normal case. When an additional signal classifier is provided, and then this signal classifier indicates speech, and when concurrently the time warp information indicates a pitch contour, then a lower or even zero noise filling level is signaled. Thus, the noise filling level manipulator 602 of FIG. 6*a* will reduce the manipulated noise level to zero or at least to a value lower than the low value indicated in FIG. 6*b*. The signal classifier additionally has a voiced/unvoiced detector as indicated in the left of FIG. 6*b*. In the case of voiced speech, a very low or zero noise filling level is signaled/applied. However, in the case of unvoiced speech, where the time warp indication does not indicate a time warp processing due to the fact that no pitch was found, but where the signal classifier signals speech content, the noise filling measure is not manipulated, but a normal noise filling level is applied.

The audio signal analyzer comprises a pitch tracker for generating an indication of the pitch such as a pitch contour or an absolute pitch of a time frame of the audio signal. Then, the manipulator is configured for reducing the noise filling measure when a pitch is found, and to not reduce the noise filling measure when a pitch is not found.

As indicated in FIG. 6*a*, a signal analyzer 600 is, when applied to the decoder-side, not performing an actual signal analysis like a pitch tracker or a voiced/unvoiced detector, but the signal analyzer parses the encoded audio signal in order to extract a time warp information or a signal classification information. Therefore, the signal analyzer 600 may be implemented within the input interface 539 in the FIG. 5*b* decoder.

A further embodiment of the present invention will be subsequently discussed with respect to FIGS. 7*a*-7*e*.

For onsets of speech where a voiced speech part begins after a relative silent signal portion, the block switching algorithm might classify it as an attack and might chose short blocks for this particular frame, with a loss of coding gain on the signal segment that has a clear harmonic structure. Therefore, the voiced/unvoiced classification of the pitch tracker is used to detect voiced onsets and prevent the block switching algorithm from indicating a transient attack around the found onset. This feature may also be coupled with the signal classifier to prevent block switching on speech signals and allow them for all other signals. Furthermore a finer control of the block switching might be implemented by not only allow or disallow the detection of attacks, but use a variable threshold for attack detection based on the voiced onset and signal classification information. Furthermore, the information can be used to detect attacks like the above mentioned voiced onsets but instead of switching to short blocks, use long windows with short overlaps, which remain the advantageous spectral resolution but decrease the time region where pre and post echoes may arise. FIG. 7*d* shows the typical behavior without the adaptation, FIG. 7*e* shows two different possibilities of adaptation (prevention and low overlap windows).

An audio encoder in accordance with an embodiment of the present invention operates for generating an audio signal such as the signal output by output interface 522 from FIG. 5*a*. The audio encoder comprises an audio signal analyzer such as the time warp analyzer 516 or a signal classifier 520 of FIG. 5*a*. Generally, the audio signal analyzer analyzes whether a time frame of the audio signal has a harmonic or speech characteristic. To this end, the signal classifier 520 of FIG. 5*a* may include a voiced/unvoiced detector 520*a* or a speech/no speech detector 520*b*. Although not shown in FIG. 7*a*, a time warp analyzer such as the time warp analyzer 516 of FIG. 5*a*, which can include a pitch tracker can also be provided instead of items 520*a* and 520*b* or in addition to these functionalities. Additionally, the audio encoder comprises the window function controller 504 for selecting a window function depending on a harmonic or speech characteristic of the audio signal as determined by the audio signal analyzer. The windower 502 then windows the audio signal or, depending on the certain implementation, the time warped audio signal using the selected window function to obtain a windowed frame. This window frame is, then, further processed by a processor to obtain an encoded audio signal. The processor can comprise items 508, 510, 512 illustrated in FIG. 5*a* or more or less functionalities of well-known audio encoders such as transform based audio encoders or time domain-based audio encoders which comprise an LPC filter such as speech coders and, specifically, speech coders implemented in accordance with the AMR-WB+ standard.

In an embodiment, the window function controller 504 comprises a transient detector 700 for detecting a transient in the audio signal, wherein the window function controller is configured for switching from a window function for a long block to a window function for a short block, when a transient is detected and a harmonic or speech characteristic is not found by the audio signal analyzer. When, however, a transient is detected and a harmonic or speech characteristic is found by the audio signal analyzer, then the window function controller 504 does not switch to the window function for the short block. Window function outputs indicating a long window when no transient is obtained and a short window when a transient is detected by the transient detector are illustrated as 701 and 702 in FIG. 7*a*. This normal procedure as performed by the well-known AAC encoder is illustrated in FIG. 7*d*. At the position of the voice onset, transient detector 700 detects an increase of energy from one frame to the next frame and, therefore, switches from a long window 710 to short windows 712. In order to accommodate this switch, a long stop window 714 is used, which has a first overlapping portion 714*a*, a non-aliasing portion 714*b*, a second shorter overlap portion 714*c* and a zero portion extending between point 716 and the point on the time axis indicated by 2048 samples. Then, the sequence of short windows indicated at 712 is performed which is, then, ended by a long start window 718 having a long overlapping portion 718*a* overlapping with the next long window not illustrated in FIG. 7*d*. Furthermore, this window has a non-aliasing portion 718*b*, a short overlap portion 718*c* and a zero portion extending between point 720 on the time axis until the 2048 point. This portion is a zero portion.

Normally, the switching over to short windows is useful in order to avoid pre-echoes which would occur within a frame before the transient event which is the position of the voiced onset or, generally, the beginning of the speech or the beginning of a signal having a harmonic content. Generally, a signal has a harmonic content, when a pitch tracker decides that the signal has a pitch. Alternatively, there are other harmonicity measures such as a tonality measure above a certain minimum level together with a characteristic that prominent peaks are in a harmonic relation to each other. A plurality of further techniques exist to determine, whether a signal is harmonic or not.

A disadvantage of short windows is that the frequency resolution is decreased, since the time resolution is increased. For high quality encoding of speech and, specifically, voiced speech portions or portions having a strong harmonic content, a good frequency resolution is desired. Therefore, the audio signal analyzer illustrated at 516, 520 or 520*a*, 520*b* is operative to output a deactivate signal to the transient detector 700 so that a switch over to short windows is prevented when a voiced speech segment or a signal segment having a strong harmonic characteristic is detected. This ensures that, for coding such signal portions, a high frequency resolution is maintained. This is a trade off between pre-echoes on the one hand and high quality and high resolution encoding of the pitch for the speech signal or the pitch for a harmonic non-speech signal on the other hand. It has been found out that it is much more disturbing when the harmonic spectrum is not encoded accurately compared to any pre-echoes which would occur. In order to furthermore decrease the pre-echoes, a TNS processing is favored for such a situation, which will be discussed in connection with FIGS. 8*a* and 8*b*.

Figure 7A:
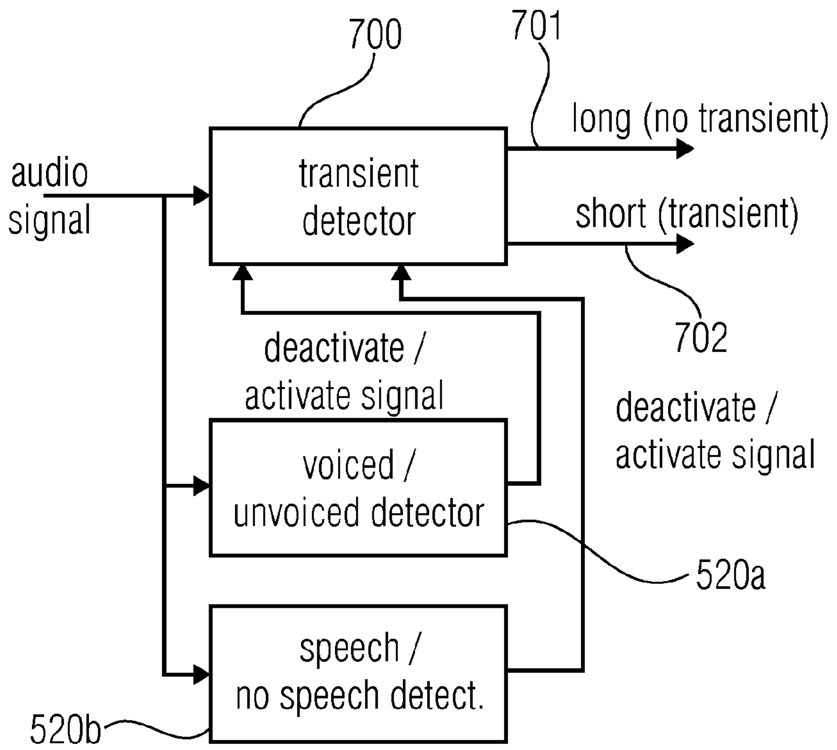
FIG. 7*a* is an embodiment for performing a time warp-based block switching in accordance with the present invention.
Figure 7B:
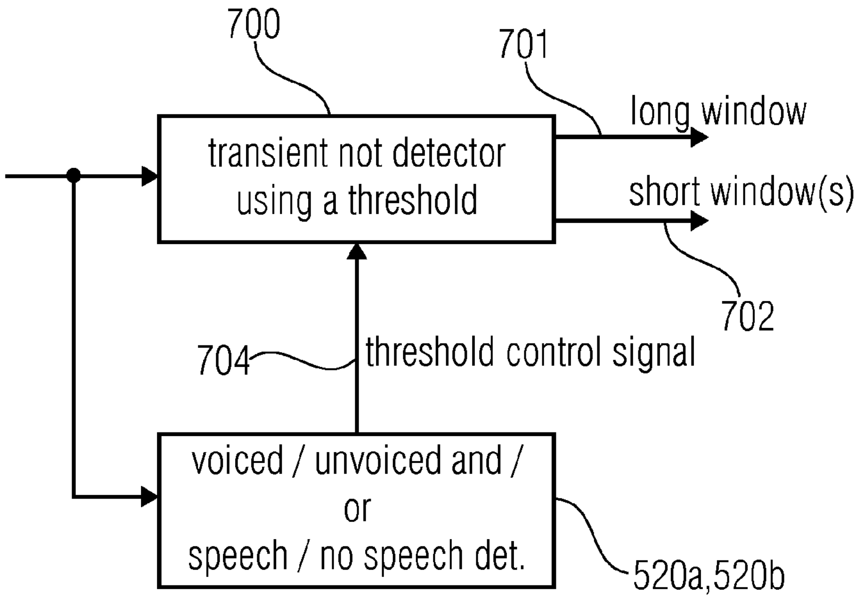
FIG. 7*b* is an alternative embodiment for influencing the window function.

In an alternative embodiment illustrated in FIG. 7*b*, the audio signal analyzer comprises a voiced/unvoiced and/or speech/non-speech detector 520*a*, 520*b*. However, the transient detector 700 included in the window function controller is not fully activated/deactivated as in FIG. 7*a*, but the threshold included in the transient detector is controlled using a threshold control signal 704. In this embodiment, the transient detector 700 is configured for determining a quantitative characteristic of the audio signal and for comparing the quantitative characteristic to the controllable threshold, wherein a transient is detected when the quantitative characteristic has a predetermined relation to the controllable threshold. The quantitative characteristic can be a number indicating the energy increase from one block to the next block, and the threshold can be a certain threshold energy increase. When the energy increase from one block to the next is higher than the threshold energy increase, then a transient is detected, so that, in this case, the predetermined relation is a "greater than" relation. In other embodiments, the predetermined relation can also be a "lower than" relation, for example when the quantitative characteristic is an inverted energy increase. In the FIG. 7*b* embodiment, the controllable threshold is controlled so that the likelihood for a switch to a window function for a short block is reduced, when the audio signal analyzer has found a harmonic or speech characteristic. In the energy increase embodiment, the threshold control signal 704 will result in an increase of the threshold so that switches to short blocks occur only when the energy increase from one block to the next is a particularly high energy increase.

In an alternative embodiment, the output signal from the voiced/unvoiced detector 520*a* or the speech/no speech detector 520*b* can also be used to control the window function controller 504 in such a way that instead of switching over to a short block at a speech onset, switching over to a window function which is longer than the window function for the short block is performed. This window function ensures a higher frequency resolution than a short window function, but has a shorter length than the long window function so that a good comprise between pre-echoes on the one hand and a sufficient frequency resolution on the other hand is obtained. In an alternative embodiment, a switch over to a window function having a smaller overlap can be performed as indicated by the hatched line in FIG. 7*e* at 706. The window function 706 has a length of 2048 samples as the long block, but this window has a zero portion 708 and a non-aliasing portion 710 so that a short overlap length 712 from window 706 to a corresponding window 707 is obtained. The window function 707, again, has a zero portion left of region 712 and a non-aliasing portion to the right of region 712 in analogy to window function 710. This low-overlap embodiment, effectively results in shorter time length for reducing pre-echoes due to the zero portion of window 706 and 707, but on the other hand has a sufficient length due to the overlap portion 714 and the non-aliasing portion 710 so that a sufficiently enough frequency resolution is maintained.

In the MDCT implementation as implemented by the AAC encoder, maintaining a certain overlap provides the additional advantage that, on the decoder side, an overlap/add processing can be performed which means that a kind of cross-fading between blocks is performed. This effectively avoids blocking artifacts. Additionally, this overlap/add feature provides the cross-fading characteristic without increasing the bitrate, i.e., a critically sampled cross-fade is obtained. In regular long windows or short windows, the overlap portion is a 50% overlap as indicated by the overlapping portion 714. In the embodiment where the window function is 2048 samples long, the overlap portion is 50%, i.e., 1024 samples. The window function having a shorter overlap which is to be used for effectively windowing a speech onset or an onset of a harmonic signal is less than 50% and is, in the FIG. 7*e* embodiment, only 128 samples, which is 1/16 of the whole window length. Overlap portions between 1/4 and 1/32 of the whole window function length are used.

Figure 7C:
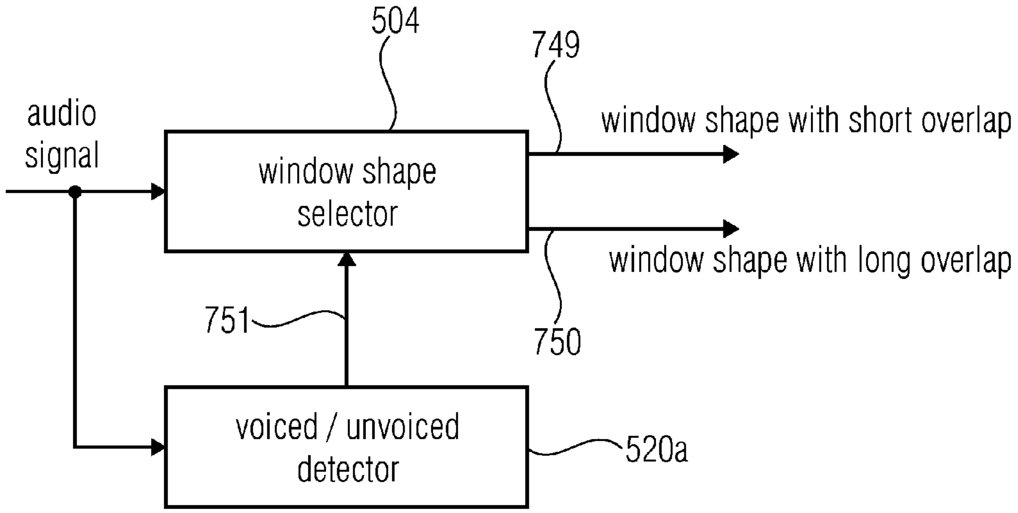
FIG. 7*c* is a further alternative embodiment for illustrating the window function based on time warp information.
Figure 7D:
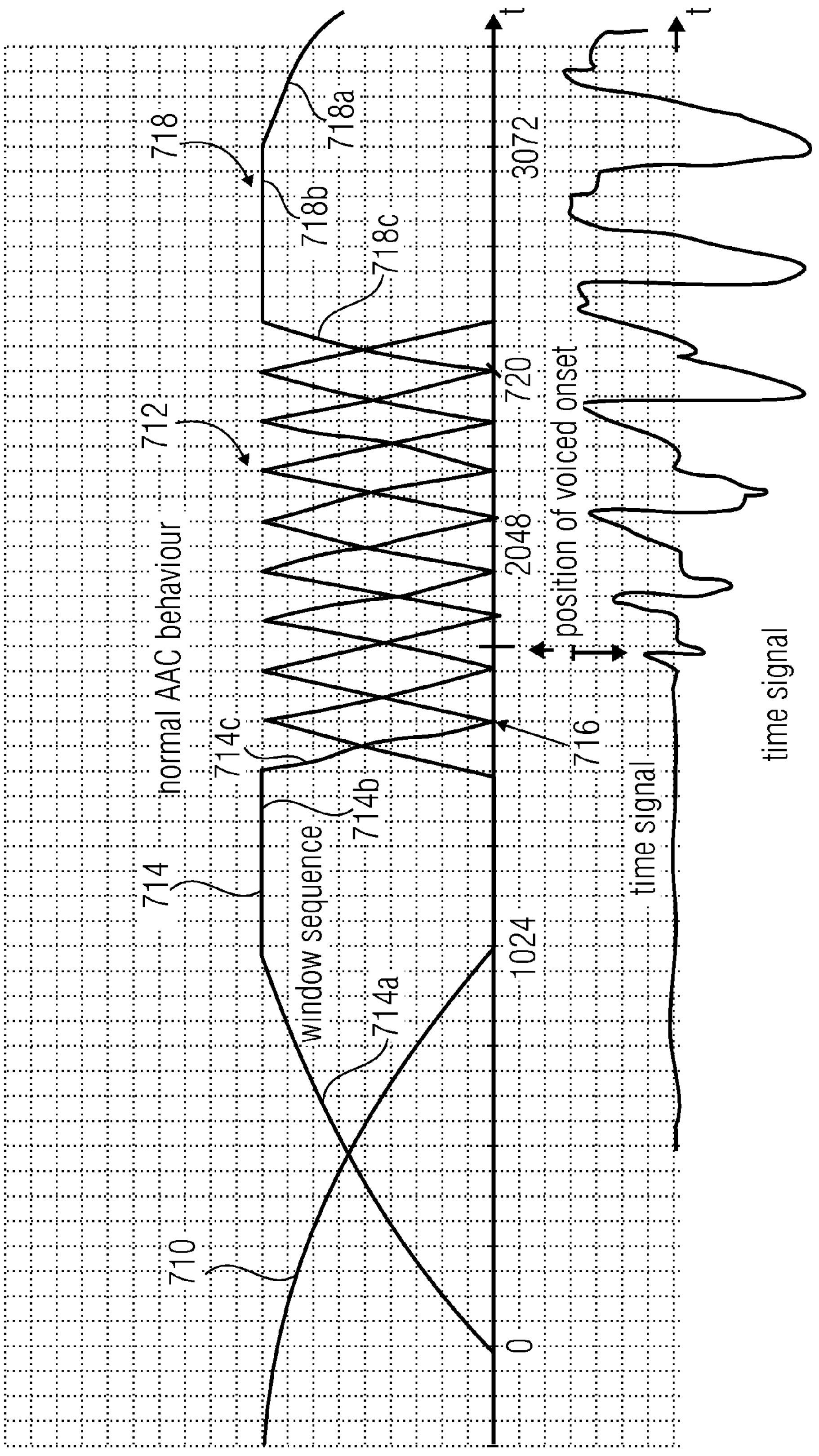
FIG. 7*d* is a window sequence of a normal AAC behavior at a voiced onset.
Figure 7E:
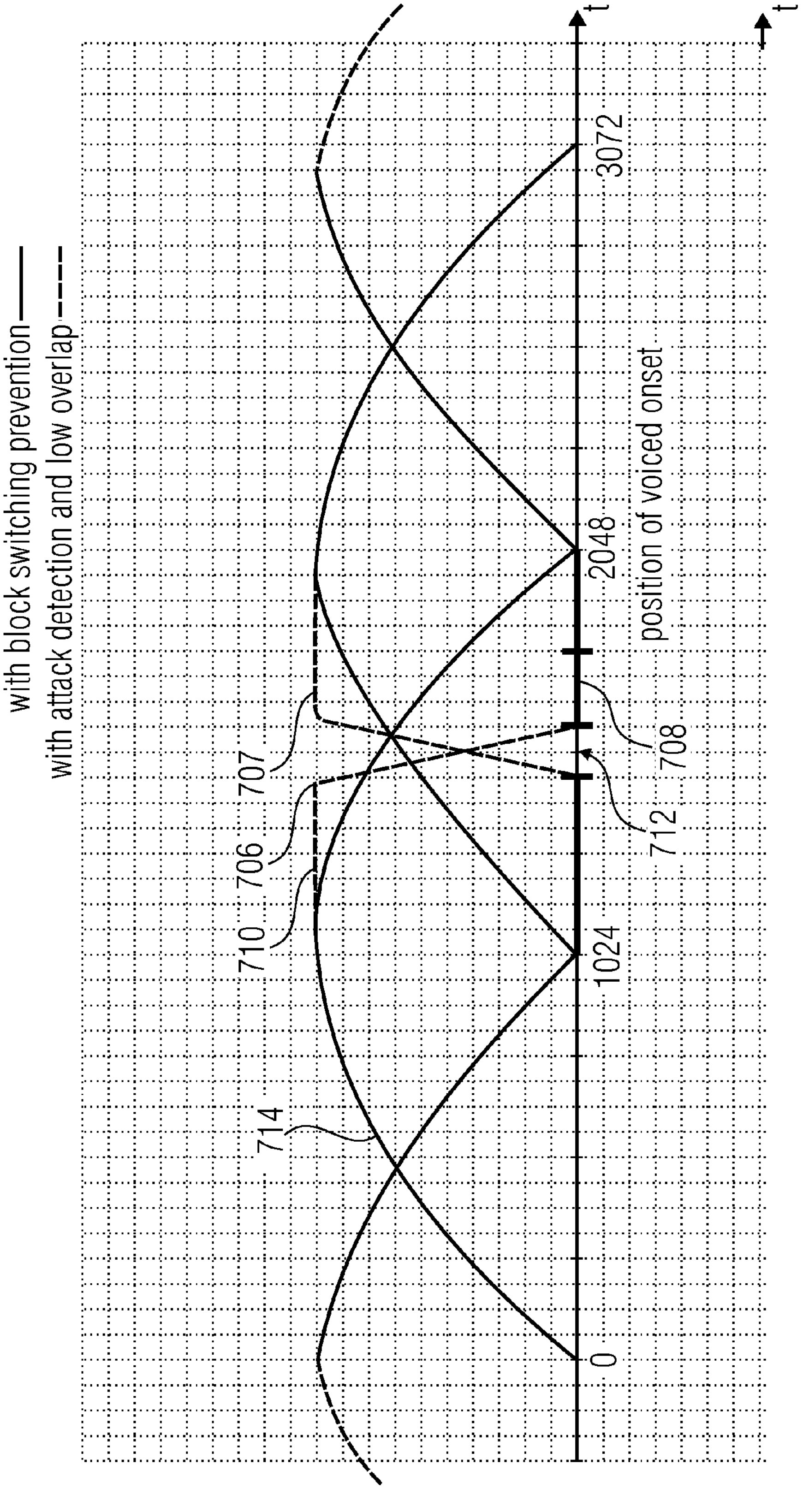
FIG. 7*e* is alternative window sequences obtained in accordance with an embodiment of the present invention.

FIG. 7*c* illustrates this embodiment, in which an exemplary voiced/unvoiced detector 520*a* controls a window shape selector included in the window function controller 504 in order to either select a window shape with a short overlap as indicated at 749 or a window shape with a long overlap as indicated at 750. The selection of one of both shapes is implemented, when the voiced/unvoiced detector 500*a* issues a voiced detected signal at 751, where the audio signal used for analysis can be the audio signal at input 500 in FIG. 5*a* or a pre-processed audio signal such as a time warped audio signal or an audio signal which has been subjected to any other pre-processing functionality. The window shape selector 504 in FIG. 7*c* which is included in the window function controller 504 in FIG. 5*a* only uses the signal 751, when a transient detector included in the window function controller would detect a transient and would command a switch from a long window function to a short window function as discussed in connection with FIG. 7*a*.

The window function switching embodiment is combined with a temporal noise shaping embodiment discussed in connection with FIGS. 8*a* and 8*b*. However, the TNS (temporal noise shaping) embodiment can also be implemented without the block switching embodiment.

The spectral energy compaction property of the time warped MDCT also influences the temporal noise shaping (TNS) tool, since the TNS gain tends to decrease for time warped frames especially for some speech signals. Nevertheless it is desirable to activate TNS, e.g. to reduce pre-echoes on voiced onsets or offsets (cf. block switching adaption), where no block switching is desired but still the temporal envelope of the speech signal exhibits rapid changes. Typically, an encoder uses some measure to see if the application of the TNS is fruitful for a certain frame, e.g. the prediction gain of the TNS filter when applied to the spectrum. So a variable TNS gain threshold is advantageous, which is lower for segments with an active pitch contour, so that it is ensured that TNS is more often active for such critical signal portions like voiced onsets. As with the other tools, this may also be complemented by taking the signal classification into account.

The audio encoder in accordance with this embodiment for generating an audio signal comprises a controllable time warper such as time warper 506 for time warping the audio signal to obtain a time warped audio signal. Additionally, a time/frequency converter 508 for converting at least a portion of the time warped audio signal into a spectral representation is provided. The time/frequency converter 508 implements an MDCT transform as known from the AAC encoder, but the time/frequency converter can also perform any other kind of transforms such as a DCT, DST, DFT, FFT or MDST transform or can comprise a filter bank such as a QMF filter bank.

Additionally, the encoder comprises a temporal noise shaping stage 510 for performing a prediction filtering over frequency of the spectral representation in accordance with the temporal noise shaping control instruction, wherein the prediction filtering is not performed, when the temporal noise shaping control instruction does not exist.

Additionally, the encoder comprises a temporal noise shaping controller for generating the temporal noise shaping control instruction based on the spectral representation.

Specifically, the temporal noise shaping controller is configured for increasing the likelihood for performing the prediction filtering over frequency, when the spectral representation is based on a time warped time signal or for decreasing the likelihood for performing the prediction filtering over frequency, when the spectral representation is not based on a time warped time signal. Specifics of the temporal noise shaping controller are discussed in connection with FIG. 8.

The audio encoder additionally comprises a processor for further processing a result of the prediction filtering over frequency to obtain the encoded signal. In an embodiment, the processor comprises the quantizer encoder stage 512 illustrated in FIG. 5*a*.

A TNS stage 510 illustrated in FIG. 5*a* is illustrated in detail in FIG. 8. The temporal noise shaping controller included in stage 510 comprises a TNS gain calculator 800, a subsequently connected TNS decider 802 and a threshold control signal generator 804. Depending on a signal from the time warp analyzer 516 or the signal classifier 520 or both, the threshold control signal generator 804 outputs a threshold control signal 806 to the TNS decider. The TNS decider 802 has a controllable threshold, which is increased or decreased in accordance with the threshold control signal 806. The threshold in the TNS decider 802 is, in this embodiment, a TNS gain threshold. When the actually calculated TNS gain output by block 800 exceeds the threshold, then the TNS control instruction needs a TNS processing as output, while, in the other case when the TNS gain is below the TNS gain threshold, no TNS instruction is output or a signal is output which instructs that the TNS processing is not useful and is not to be performed in this specific time frame.

The TNS gain calculator 800 receives, as an input, the spectral representation derived from the time warped signal. Typically, a time warped signal will have a lower TNS gain, but on the other hand, a TNS processing due to the temporal noise shaping feature in the time domain is beneficiary in the specific situation, where there is a voiced/harmonic signal which has been subjected to a time warping operation. On the other hand, the TNS processing is not useful in situations, where the TNS gain is low, which means that the TNS residual signal at line 510*b* has the same or a higher energy as the signal before the TNS stage 510. In a situation, where the energy of the TNS residual signal on line 510*d* is slightly lower than the energy before the TNS stage 510, the TNS processing might also not be of advantage, since the bit reduction due to the slightly smaller energy in the signal which is efficiently used by the quantizer/entropy encoder stage 512 is smaller than the bit increase introduced by the needed transmission of the TNS side information indicated at 510*a* in FIG. 5*a*. Although one embodiment automatically switches on the TNS processing for all frames, in which a time warped signal is input indicated by the pitch information from block 516 or the signal classifier information from block 520, an embodiment also maintains the possibility to deactivate TNS processing, but only when the gain is really low or at least lower than in the normal case, when no harmonic/speech signal is processed.

Figures 8A, 8B:
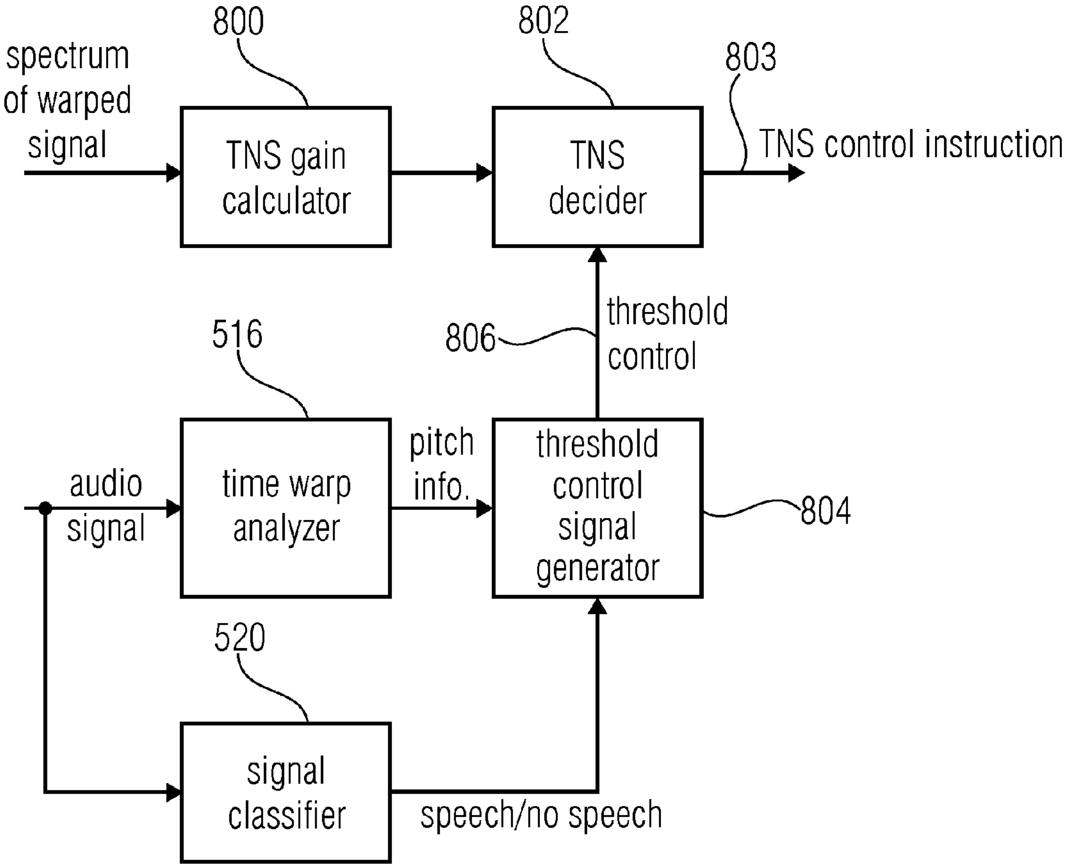
FIG. 8*a* is the embodiment of a time warp-based control of the TNS (temporal noise shaping) tool.
FIG. 8*b* is a table defining control procedures performed in the threshold control signal generator in FIG. 8*a;*

FIG. 8*b* illustrates an implementation where three different threshold settings are implemented by the threshold control signal generator 804/TNS decider 802. When a pitch contour does not exist, and when a signal classifier indicates an unvoiced speech or no speech at all, then the TNS decision threshold is set to be in a normal state requiring a relatively high TNS gain for activating TNS. When, however, a pitch contour is detected, but the signal classifier indicates no speech or the voiced/unvoiced detector detects an unvoiced speech, then the TNS decision threshold is set to a lower level, which means that even when comparatively low TNS gains are calculated by block 800 in FIG. 8*a*, nevertheless the TNS processing is activated.

In a situation, in which an active pitch contour is detected and in which voiced speech is found, then, the TNS decision threshold is set to the same lower value or is set to an even lower state so that even small TNS gains are sufficient for activating a TNS processing.

In an embodiment, the TNS gain controller 800 is configured for estimating a gain in bit rate or quality, when the audio signal is subjected to the prediction filtering over frequency. A TNS decider 802 compares the estimated gain to a decision threshold, and a TNS control information in favor of the prediction filtering is output by block 802, when the estimated gain is in a predetermined relation to the decision threshold, where this predetermined relation can be a “greater than” relation, but can also be a “lower than” relation for an inverted TNS gain for example. As discussed, the temporal noise shaping controller is furthermore configured for varying the decision threshold using the threshold control signal 806 so that, for the same estimated gain, the prediction filtering is activated, when the spectral representation is based on the time warped audio signal, and is not activated, when the spectral representation is not based on the time warped audio signal.

Normally, voiced speech will exhibit a pitch contour, and unvoiced speech such as fricatives or sibilants will not exhibit a pitch contour. However, there do exist non-speech signals, which strong harmonic content and, therefore, have a pitch contour, although the speech detector does not detect speech. Additionally, there exist certain speech over music or music over speech signals, which are determined by the audio signal analyzer (516 of FIG. 5*a* for example) to have an harmonic content, but which are not detected by the signal classifier 520 as being a speech signal. In such a situation, all processing operations for voiced speech signals can also be applied and will also result in an advantage.

Subsequently, a further embodiment of the present invention with respect to an audio encoder for encoding an audio signal is described. This audio encoder is specifically useful in the context of bandwidth extension, but is also useful in stand alone encoder applications, where the audio encoder is set to code a certain number of lines in order to obtain a certain bandwidth limitation/low-pass filtering operation. In non-time-warped applications, this bandwidth limitation by selecting a certain predetermined number of lines will result in a constant bandwidth, since the sampling frequency of the audio signal is constant. In situations, however, in which a time warp processing such as by block 506 in FIG. 5*a* is performed, an encoder relying on a fixed number of lines will result in a varying bandwidth introducing strong artifacts not only perceivable by trained listeners but also perceivable by untrained listeners.

The AAC core coder normally codes a fixed number of lines, setting all others above the maximum line to zero. In the unwarped case this leads to a low-pass effect with a constant cut-off frequency and therefore a constant bandwidth of the decoded AAC signal. In the time warped case the bandwidth varies due to the variation of the local sampling frequency, a function of the local time warping contour, leading to audible artifacts. The artifacts can be reduced by adaptively choosing the number of lines—as a function of the local time warping contour and its obtained average sampling rate—to be coded in the core coder depending on the local sampling frequency such that a constant average bandwidth is obtained after time re-warping in the decoder for all frames. An additional benefit is bit saving in the encoder.

The audio encoder in accordance with this embodiment comprises the time warper 506 for time warping an audio signal using a variable time warping characteristic. Additionally, a time/frequency converter 508 for converting a time warped audio signal into a spectral representation having a number of spectral coefficients is provided. Additionally, a processor for processing a variable number of spectral coefficients to generate the encoded audio signal is used, where this processor comprising the quantizer/coder block 512 of FIG. 5*a* is configured for setting a number of spectral coefficients for a frame of the audio signal based on the time warping characteristic for the frame so that a bandwidth variation represented by the processed number of frequency coefficients from frame to frame is reduced or eliminated.

The processor implemented by block 512 may comprise a controller 1000 for controlling the number of lines, where the result of the controller 1000 is that, with respect to a number of lines set for the case of a time frame being encoded without any time warping, a certain variable number of lines is added or discarded at the upper end of the spectrum. Depending on the implementation, the controller 1000 can receive a pitch contour information in a certain frame 1001 and/or a local average sampling frequency in the frame indicated at 1002.

Figures 9A, 9B, 9C:
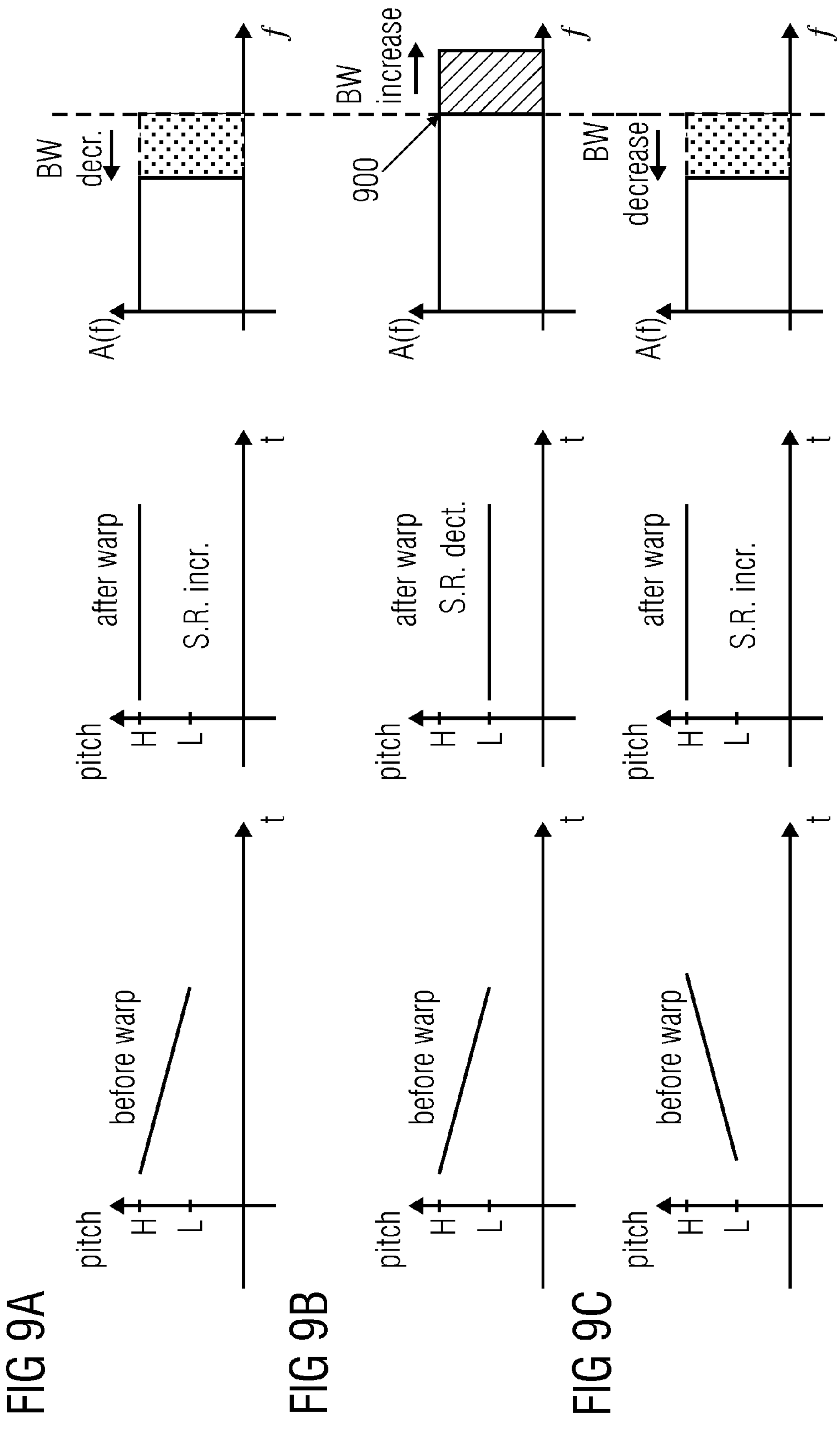
FIG. 9*a*-9*e* are different time warping characteristics and the corresponding influence on the bandwidth of the audio signal occurring subsequent to a decoder-side time dewarping operation.
Figure 9D:
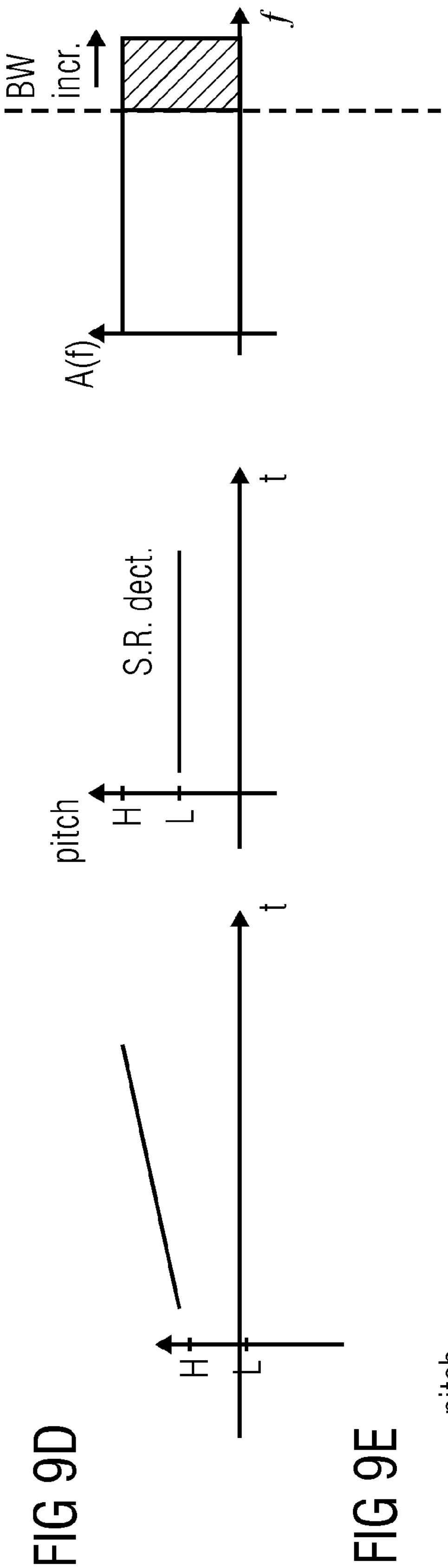
Figure 9E:
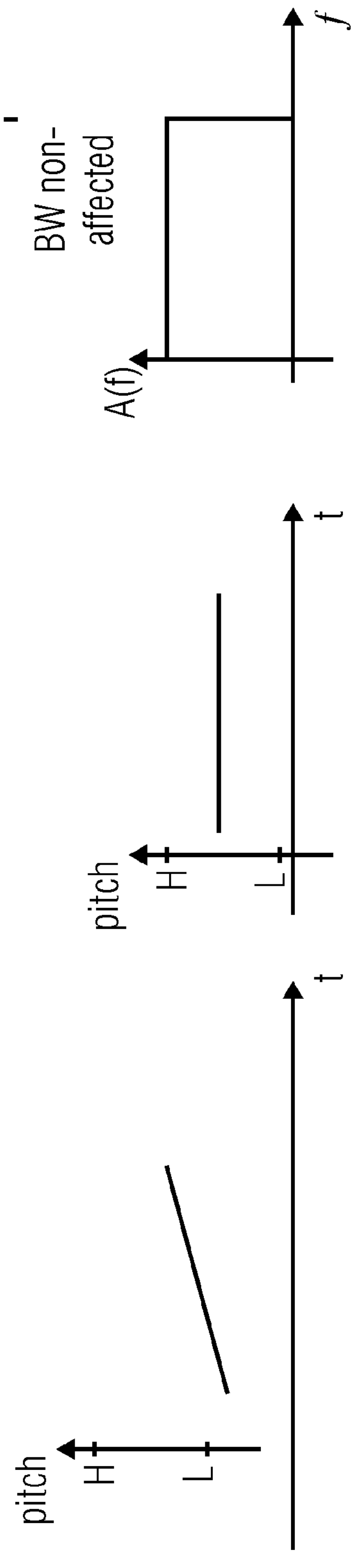

In the FIGS. 9(*a*) to 9(*e*), the right pictures illustrate a certain bandwidth situation for certain pitch contours over a frame, where the pitch contours over the frame are illustrated in the respective left pictures for the time warp and are illustrated in the medium pictures after the time warp, where a substantially constant pitch characteristic is obtained. This is the target of the time warping functionality that, after time warping, the pitch characteristic is as constant as possible.

The bandwidth 900 illustrates the bandwidth which is obtained when a certain number of lines output by a time/frequency converter 508 or output by a TNS stage 510 of FIG. 5*a* is taken, and when a time warping operation is not performed, i.e., when the time warper 506 was deactivated, as indicated by the hatched line 507. When, however, a non-constant time warp contour is obtained, and when this time warp contour is brought to a higher pitch inducing a sampling rate increase (FIG. 9(*a*), (*c*)) the bandwidth of the spectrum decreases with respect to a normal, non-time-warped situation. This means that the number of lines to be transmitted for this frame has to be increased in order to balance this loss of bandwidth.

Alternatively, bringing the pitch to a lower constant pitch illustrated in FIG. 9(*b*) or FIG. 9(*d*) results in a sampling rate decrease. The sampling rate decrease results in a bandwidth increase of the spectrum of this frame with respect to the linear scale, and this bandwidth increase has to be balanced using a deletion or discarding of a certain number of lines with respect to the value of number of lines for the normal non-time-warped situation.

Figure 11:
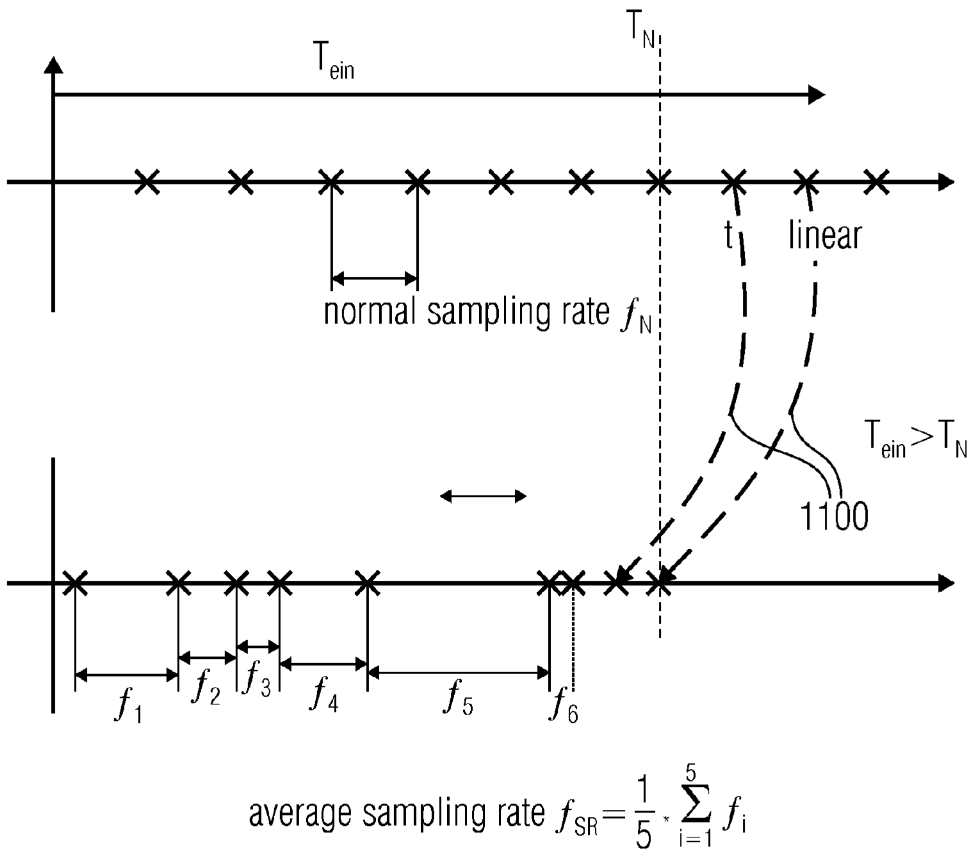
FIG. 11 is a comparison between a linear time scale and a warped time scale.

FIG. 9(*e*) illustrates a special case, in which a pitch contour is brought to a medium level so that the average sampling frequency within a frame is, instead of performing the time warping operation, the same as the sampling frequency without any time warping. Thus, the bandwidth of the signal is non-affected, and the straightforward number of lines to be used for the normal case without time warping can be processed, although the time warping operation is be performed. From FIG. 9, it becomes clear that performing a time warping operation does not necessarily influence the bandwidth, but the influencing of the bandwidth depends on the pitch contour and the way, how the time warp is performed in a frame. Therefore, it is advantageous to use, as the control value, a local or average sampling rate. The determination of this local sampling rate is illustrated in FIG. 11. The upper portion in FIG. 11 illustrates a time portion with equidistant sampling values. A frame includes, for example, seven sampling values indicated by $T_n$ in the upper plot. The lower plot shows the result of a time warping operation, in which, altogether, a sampling rate increase has taken place. This means that the time length of the time warped frame is smaller than the time length of the non-time-warped frame. Since, however, the time length of the time warped frame to be introduced into the time/frequency converter is fixed, the case of a sampling rate increase causes that an additional portion of the time signal not belonging to the frame indicated by $T_n$ is introduced into the time warped frame as indicated by lines 1100. Thus, a time warped frame covers a time portion of the audio signal indicated by $T_{lin}$ which is longer than the time $T_n$. In view of that, the effective distance between two frequency lines or the frequency bandwidth of a single line in the linear domain (which is the inverse value for the resolution) has decreased, and the number of lines $N_n$ set for a non-time-warped case when multiplied by the reduced frequency distance results in a smaller bandwidth, i.e., a bandwidth decrease.

The other case, not illustrated in FIG. 11, where a sampling rate decrease is performed by the time warper, the effective time length of a frame in the time warped domain is smaller than the time length of the non-time-warped domain so that the frequency bandwidth of a single line or the distance between two frequency lines has increased. Now, multiplying this increased $\Delta f$ by the number $N_N$ of lines for the normal case will result in an increased bandwidth due to the reduced frequency resolution/increased frequency distance between two adjacent frequency coefficients.

Figure 10A:
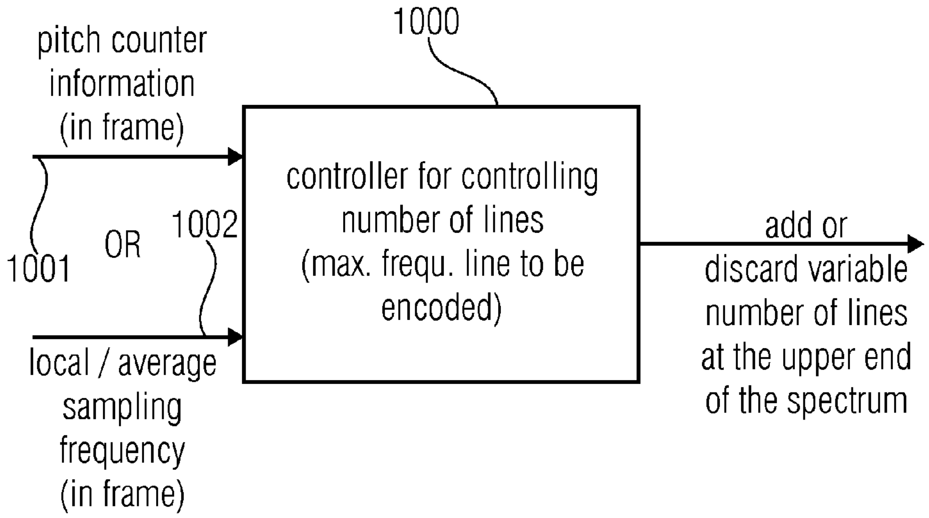
FIG. 10*a* is an embodiment of a controller for controlling the number of lines within an encoding processor.

FIG. 11 additionally illustrates, how an average sampling rate $f_{SR}$ is calculated. To this end, the time distance between two time warped samples is determined and the inverse value is taken, which is defined to be the local sampling rate between two time warped samples. Such a value can be calculated between each pair of adjacent samples, and the arithmetic mean value can be calculated and this value finally results in the average local sampling rate, which is used for being input into the controller 1000 of FIG. 10*a*.

Figure 10B:
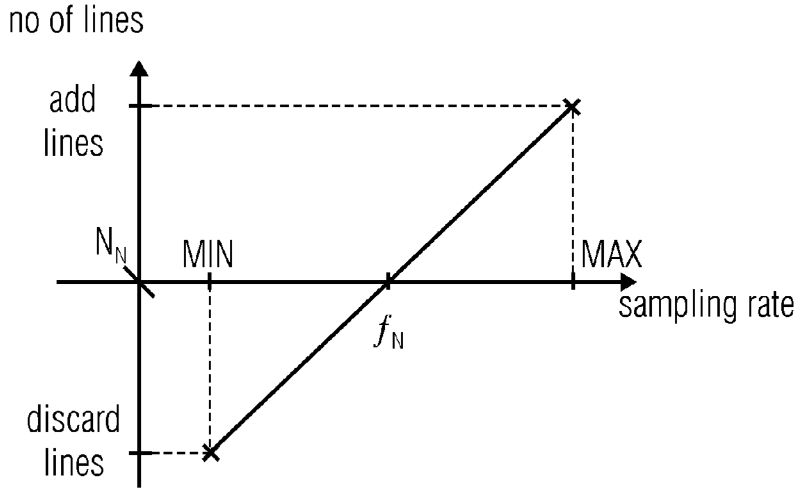
FIG. 10*b* is a dependence between the number of lines to be discarded/added for a sampling rate.

FIG. 10*b* illustrates a plot indicating how many lines have to be added or discarded depending on the local sampling frequency, where the sampling frequency $f_N$ for the unwarped case together the number of lines $N_N$ for the non-time-warped case defines the intended bandwidth, which should be kept constant as much as possible for a sequence of time warped frames or for a sequence of time warped and non-time-warped frames.

FIG. 12*b* illustrates the dependence between the different parameters discussed in connection with FIG. 9, FIG. 10*b* and FIG. 11. Basically, when the sampling rate, i.e., the average sampling rate $f_{SR}$ decreases with respect to the non-time-warped case, lines have to be deleted, while lines have to be added, when the sampling rate increases with respect to the normal sampling rate $f_N$ for the non-time-warped case so that bandwidth variations from frame to frame are reduced or even eliminated as much as possible.

Figure 12A:
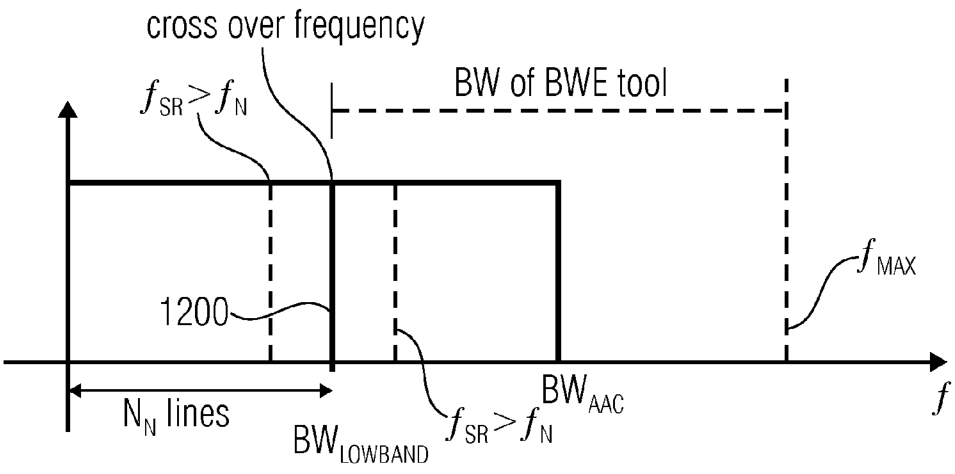
FIG. 12*a* is an implementation in the context of bandwidth extension.

The bandwidth resulting by the number of lines $N_N$ and the sampling rate $f_N$ defines the cross-over frequency 1200 for an audio coder which, in addition to a source core audio encoder, has a bandwidth extension encoder (BWE encoder). As known in the art, a bandwidth extension encoder only codes a spectrum with a high bit rate until the cross-over frequency and encodes the spectrum of the high band, i.e., between the cross-over frequency 1200 and the frequency $f_{MAX}$ with a low bit rate, where this low bit rate typically is even lower than 1/10 or less of the bit rate needed for the low band between a frequency of 0 and the cross-over frequency 1200. FIG. 12*a* furthermore illustrates the bandwidth $BW_{AAC}$ of a straightforward AAC audio encoder, which is much higher than the cross-over frequency. Hence, lines can not only be discarded, but can be added as well. Furthermore, the variation of the bandwidth for a constant number of lines depending on the local sampling rate $f_{SR}$ is illustrated as well. The number of lines to be added or to be deleted with respect to the number of lines for the normal case is set so that each frame of the AAC encoded data has a maximum frequency as close as possible to the cross-over frequency 1200. Thus, any spectral holes due to a bandwidth reduction on the one hand or an overhead by transmitting information on a frequency above the cross-over frequency in the low band encoded frame are avoided. This, on the one hand, increases the quality of the decoded audio signal and, on the other hand, decreases the bit rate.

The actual adding of lines with respect to a set number of lines or a deletion of lines with respect to the set number of lines can be performed before quantizing the lines, i.e., at the input of block 512, or can be performed subsequent to quantizing or can, depending on the specific entropy code, also be performed subsequent to entropy coding.

Furthermore, it is advantageous to bring the bandwidth variations to a minimum level and to even eliminate the bandwidth variations, but, in other implementations, even a reduction of bandwidth variations by determining the number of lines depending on the time warping characteristic even increases the audio quality and decreases the needed bit rate compared to a situation, where a constant number of lines is applied irrespective of a certain time warp characteristic.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed. Some embodiments according to the invention comprise a data carrier having electronically readable control signals, which are capable of cooperating with a programmable computer system, such that one of the methods described herein is performed. Generally, embodiments of the present invention can be implemented as a computer program product with a program code, the program code being operative for performing one of the methods when the computer program product runs on a computer. The program code may for example be stored on a machine readable carrier. Other embodiments comprise the computer program for performing one of the methods described herein, stored on a machine readable carrier. In other words, an embodiment of the inventive method is, therefore, a computer program having a program code for performing one of the methods described herein, when the computer program runs on a computer. A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein. In some embodiments, a programmable logic device (for example a field programmable gate array) may be used to perform some or all of the functionalities of the methods described herein. In some embodiments, a field programmable gate array may cooperate with a microprocessor in order to perform one of the methods described herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Audio encoder for generating an audio signal, comprising:

a controllable time warper for time warping the audio signal to acquire a time warped audio signal;

a time/frequency converter for converting at least a portion of the time warped audio signal into a spectral representation;

a temporal noise shaping stage for performing a prediction filtering over frequency of the spectral representation in accordance with a temporal noise shaping control instruction, wherein the prediction filtering is not performed, when the temporal noise shaping control instruction does not exist;

a temporal noise shaping controller for generating the temporal noise shaping control instruction based on the spectral representation, wherein the temporal noise shaping controller is configured for increasing a likelihood for performing the predictive filtering over frequency, when the spectral representation is based on a time warped audio signal or for decreasing the likelihood for performing the prediction filtering over frequency, when the spectral representation is not based on a time warped audio signal; and a processor for further processing an output of the temporal noise shaping stage to acquire the encoded audio signal;

wherein the temporal noise shaping controller is configured for estimating a gain in a bitrate or a quality, when the audio signal is subjected to the prediction filtering by the temporal noise shaping stage, for comparing the estimated gain to a decision threshold, and for deciding, in favor of the prediction filtering, when the estimated gain is in a predetermined relation to the decision threshold, wherein the temporal noise shaping controller is furthermore configured for varying the decision threshold so that, for the same estimated gain, the prediction filtering is activated, when the spectral representation is based on a time warped signal, and is not activated, when the spectral representation is not based on a time-warped audio signal.

2. Audio encoder in accordance with claim 1, in which the time warper comprises a signal classifier for detecting voiced or unvoiced speech, and in which the temporal noise shaping controller is configured for increasing the likelihood, when a voiced speech is detected, or when an unvoiced speech is detected and the spectral representation is based on the time warped audio signal.

3. Method for generating an audio signal, comprising:

for time warping the audio signal to acquire a time warped audio signal;

converting at least a portion of the time warped audio signal into a spectral representation;

performing a prediction filtering over frequency of the spectral representation in accordance with a temporal noise shaping control instruction, wherein the prediction filtering is not performed, when the temporal noise shaping control instruction does not exist;

generating the temporal noise shaping control instruction based on the spectral representation, wherein a likelihood for performing the predictive filtering over frequency is increased, when the spectral representation is based on a time warped audio signal or wherein the likelihood for performing the prediction filtering over frequency is decreased, when the spectral representation is not based on a non-time-warped audio signal; and processing an output of the temporal noise shaping stage to acquire the encoded audio signal;

wherein a gain in a bitrate or a quality, when the audio signal is subjected to the prediction filtering by the temporal noise shaping stage, is estimated, and wherein the estimated gain is compared to a decision threshold, for deciding, in favor of the prediction filtering, when the estimated gain is in a predetermined relation to the decision threshold, wherein the decision threshold is varied so that, for the same estimated gain, the prediction filtering is activated, when the spectral representation is based on a time warped signal, and is not activated, when the spectral representation is not based on a time-warped audio signal.

4. A non-transitory computer-readable storage medium having program code stored thereon, wherein the program code, when executed by a computer, performs the method of claim 3.

* * * * *